United States Patent
Hayama et al.

(10) Patent No.: US 6,738,067 B2
(45) Date of Patent: May 18, 2004

(54) IMAGE PROCESSING DEVICE, IMAGE PROCESSING METHOD AND RECORDING MEDIUM

(75) Inventors: Yoshifusa Hayama, Tokyo (JP); Kazunori O, Tokyo (JP); Seiichi Yamagata, Tokyo (JP); Shinobu Hayashi, Tokyo (JP); Shigenobu Nakamura, Tokyo (JP); Kazuko Noguchi, Tokyo (JP); Makio Kida, Tokyo (JP); Takeharu Tanimura, Tokyo (JP); Tadahiro Kawamura, Tokyo (JP); Yuichiro Mine, Tokyo (JP); Hideki Tanaka, Tokyo (JP); Naohiro Warama, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 287 days.

(21) Appl. No.: 09/841,242

(22) Filed: Apr. 25, 2001

(65) Prior Publication Data

US 2001/0033282 A1 Oct. 25, 2001

Related U.S. Application Data

(62) Division of application No. 08/965,008, filed on Nov. 5, 1997.

(30) Foreign Application Priority Data

Nov. 7, 1996 (JP) .............................. 8-295558
Nov. 15, 1996 (JP) .............................. 8-305368

(51) Int. Cl.$^7$ .............................................. G06T 15/70
(52) U.S. Cl. ...................... 345/474; 463/31; 463/32
(58) Field of Search ...................... 463/30–33; 345/419, 345/420, 429, 433, 441, 473, 474, 475, 501, 523, 949, 952, 953, 955, 440, 644, 951

(56) References Cited

U.S. PATENT DOCUMENTS

| 4,600,919 A | 7/1986 | Stern ........................... 340/725 |
| 5,345,546 A | 9/1994 | Harada et al. ............... 395/142 |
| 5,767,861 A | 6/1998 | Kimura ....................... 345/473 |
| 5,850,222 A | 12/1998 | Cone ........................... 345/418 |
| 5,883,638 A | 3/1999 | Rouet et al. ................. 345/473 |
| 5,895,124 A | 4/1999 | Tsuga et al. .................. 386/98 |
| 5,966,132 A | 10/1999 | Kakizawa et al. ........... 345/419 |
| 6,054,999 A | 4/2000 | Strandberg .................. 345/474 |

FOREIGN PATENT DOCUMENTS

JP 9-94348 4/1997

OTHER PUBLICATIONS

Monheit et al., "A Kinematic Model of the Human Spine and Torso", IEEE Computer Graphics and Applications, Mar. 1991, pp. 29–38.

Primary Examiner—Mark Zimmerman
Assistant Examiner—Lance W. Sealey
(74) Attorney, Agent, or Firm—Finnegan, Henderson, Farabow, Garrett & Dunner, L.L.P.

(57) ABSTRACT

In an image processing device composed such that it can display a prescribed object whilst changing the shape of said object, there are provided: a first memory for recording information for first polygons 201 which form said object, and a second memory for recording information for second polygons 202, which form said object and are linked to said first polygons; and when the shape of said object is changed, the shapes of said second polygons are changed such that no gaps are produced between said first polygons 201 and said second polygons 202.

Using computer graphics in a video game, or the like, it is possible to achieve a more realistic object representation, wherein joint regions move in a natural manner.

9 Claims, 33 Drawing Sheets

PRIOR ART

PRIOR ART

FIG.16
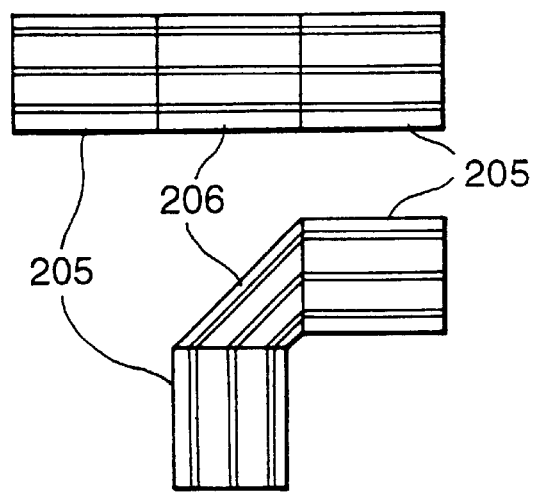
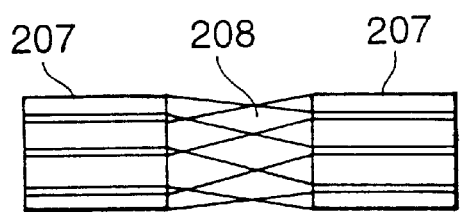
FIG.17A
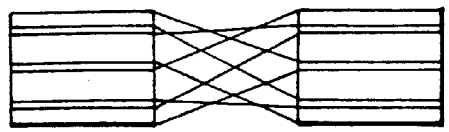
FIG.17B
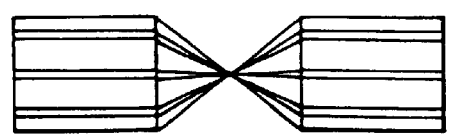
FIG.17C

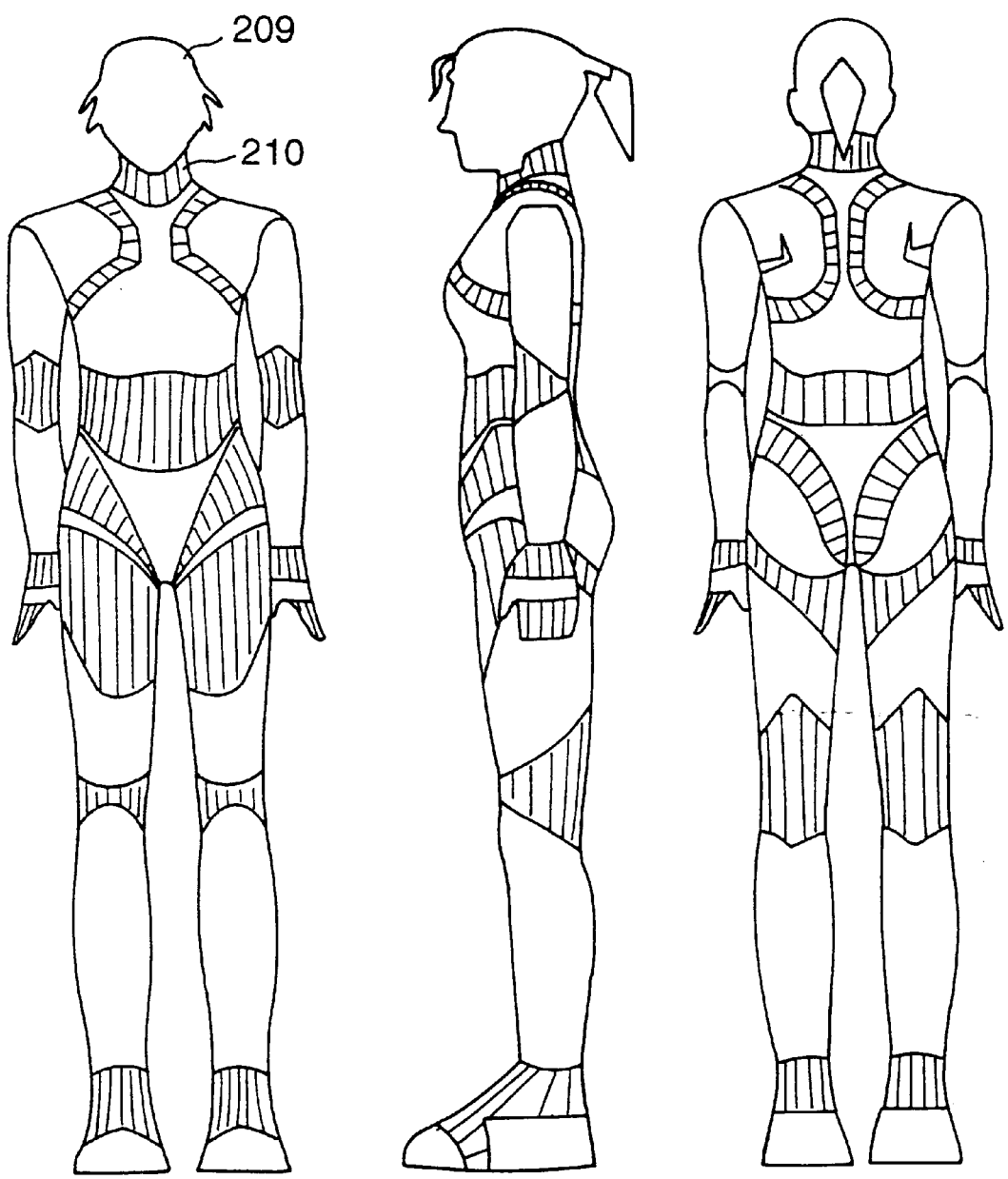

FIG.19A  FIG.19B
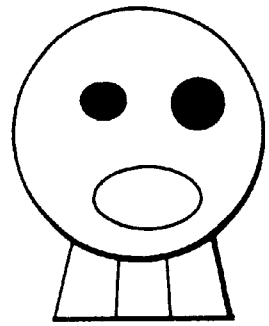
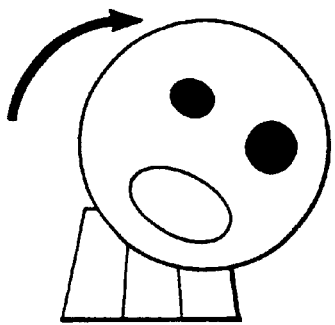
FIG.20A  FIG.20B
PRIOR ART
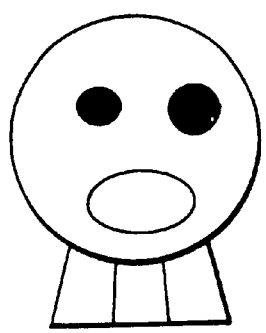
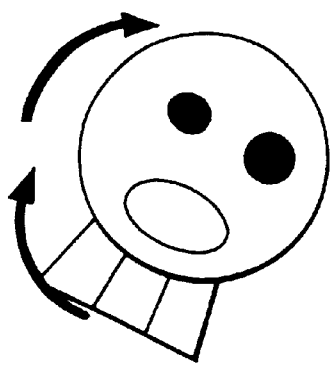

PRIOR ART

PRIOR ART

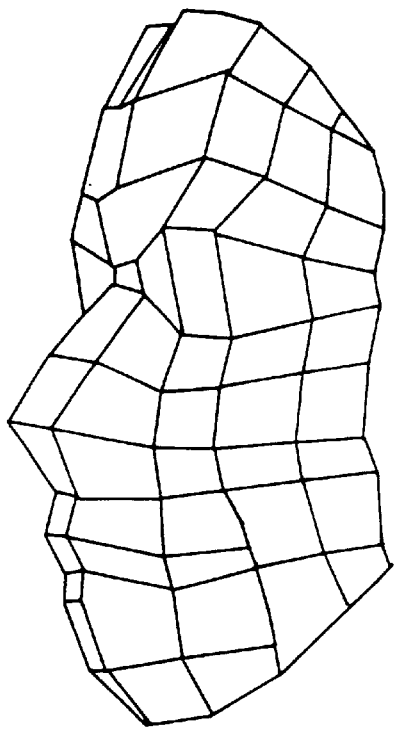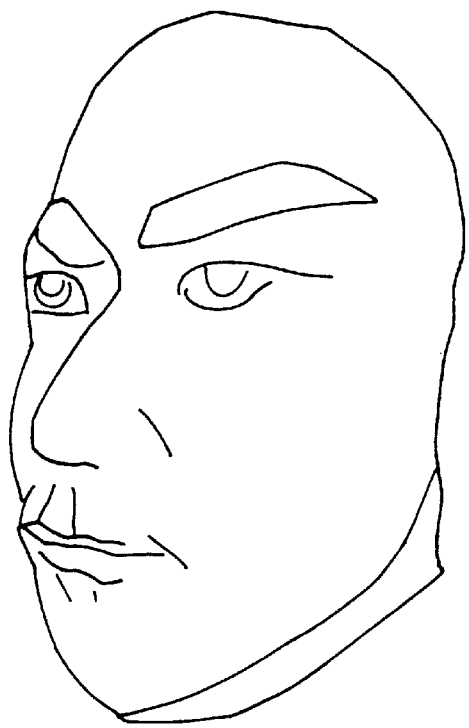
FIG.38B     FIG.38A

SHOWER OF SHOOTING STARS

BEAM

IMAGE PROCESSING DEVICE, IMAGE PROCESSING METHOD AND RECORDING MEDIUM

This application is a divisional of Ser. No. 08/965,008 filed Nov. 5, 1997.

TECHNICAL FIELD

The present invention relates to an image processing device and an image processing method, and more particularly, to an image processing device and an image processing method, and a recording medium whereon programs for same are recorded, whereby it is possible to represent smoothly the movement of objects in a "video game".

BACKGROUND ART

With progress in computer technology, video game devices (image processing devices) using computer graphics technology have come to be widely used. Video games featuring objects of a variety of game characters, for example, people or animals, are very popular, and many different video game devices of this kind have been proposed.

In video game devices of this kind, a more realistic representation of objects is sought, whereby the joints of objects move in a natural manner.

There also exists so-called "motion capture" technology, which records realistic human movement. The process of using motion data generated by this motion capture technology to influence the movement of a virtual object is known as "inverse kinematics". When applying "inverse kinematics" to a game device, or the like, it is necessary for this data of different specifications to be converted efficiently.

Moreover, if a real entity, for example, a singer, or the user him or herself is to be represented as a virtual object using this motion capture technology, then it is advantageous if a number of representations of this object are taken, using camerawork, special effects, and the like, in order to provide rich and interesting video images.

DISCLOSURE OF THE INVENTION

A first purpose of the present invention is to provide image processing technology whereby a object, which moves in a natural manner and approximates the movement of a real entity more closely than a conventional object, can be represented.

A second purpose of the present invention is to convert efficiently data of different specifications, when using motion data recording the movements of a real entity to influence the movements of a virtual object.

A third purpose of the present invention is to provide image processing technology whereby images, in which a variety of presentations conducted by a real entity are appended to a object, can be recorded and reproduced.

In an image processing device composed such that it displays a prescribed object whilst changing the shape thereof, this invention comprises: a first memory for recording information for first polygons which form a portion of the object; a second memory for recording information for second polygons, which form a further portion of the object and are linked to the first polygons; and processing means for changing the shapes of the second polygons in accordance with movement of the first polygons, when the shape of the object is changed, on the basis of the first polygon information recorded in the first memory and the second polygon information recorded in the second memory, such that no gaps are produced between the first polygons and the second polygons.

In the specification of the present invention, the following definitions are used. Polygons are polygonal shapes which are combined to represent an object. For example if an object is a virtual human body, the object is formed by a combination of parts objects representing various region such as the head, upper arms, lower arms, shoulders, thigh region, lower leg region, etc. of a body that moves as a single entity. (Hereinafter, called "part").

The present invention is characterized by its approach which involves applying different types of polygons to different areas of a object. For example, parts formed by second polygons are applied to the joint regions of a object, and parts formed by first polygons, which do not expand or contract, are applied to other regions thereof. Since the second polygons which are caused to perform complex movement are applied only to regions which expand and contract in an actual entity, it is possible to complete calculational processing for a object within the frame period forming the image transmission cycle, provided that the device used has a prescribed processing capacity.

In this invention, the object comprises a plurality of the first polygons, and the second polygons are positioned such that no gaps are formed between the second polygons and the first polygons.

In this invention, the first polygons and the second polygons share vertices in a portion thereof, and information for the first polygons and information for the second polygons is represented such that the vertices of either a first polygon or a second polygon refer to the vertices of the other polygon, and the processing means uses information for the vertices of one polygon in drawing the other polygon.

In this invention, when information for the first polygons and information for the second polygons is represented by index values in a buffer which stores information for respective polygon vertices, the sharing of vertices is represented by setting the index values to negative values.

In this invention, the object is apllied to a person, animal, or the like, appearing in a game, and the second polygons are applied to regions of the object which bend.

In this invention, the second polygons are applied to the head of an object.

In this invention, the second polygons are applied to a region from the chest to below the armpits of an object.

In this invention, the second polygons are applied to the elbows and wrists of an object.

In this invention, the second polygons are applied to a region from the feet to the toes of an object.

In this invention, selectable texture data is mapped onto at least one of the first polygons and the second polygons.

In this invention, the texture data is a photograph of a human face taken using a three-dimensional scanner.

In this invention, the texture data simulates clothing.

In an image processing method for displaying a prescribed object whilst changing the shape thereof, the present invention comprises a processing step whereby, when the shape of the object changes, the shapes of second polygons linked to first polygons comprising the image are changed in accordance with the movement of the first polygons such that no gaps are produced between the first polygons and the second polygons.

In this invention, the first polygons and the second polygons share vertices in a portion thereof, the vertices of a first polygon or a second polygon are represented by referring to the vertices of the other polygon, and the processing step uses information for the vertices of one polygon in drawing the other polygon.

This invention is a recording medium whereon programs for causing the aforementioned processing steps to be implemented in a computer are stored.

Here, a "recording medium" may be, for example, a floppy disk, a hard disk, magnetic tape, CD-ROM, DVD, ROM cartridge, RAM memory cartridge with battery back-up, flash memory cartridge, fixed RAM cartridge, or the like.

Furthermore, a wired communications medium, such as a telephone circuit, or a radio communications medium, such as a microwave circuit, may also be used. The Internet is included in this definition of communications media.

Specifically, a recording medium is a entity whereby information (mainly digital data and programs,) can be recorded by a physical means of some kind, and it is able to cause a processing device, such as a computer, special processor, or the like, to implement prescribed functions. In brief, it should enable programs to be downloaded into a computer by some means or other, thereby causing the computer to execute prescribed functions.

In an image processing device composed such that it can display a prescribed object whilst moving the object, this invention comprises: a memory which records information relating to a first element, a second element and a third element, which are mutually linked and form the object; and a processing section which changes the shape of the first element and the second element about prescribed axes, on the basis of the information recorded in the memory, and which conducts processing on the basis of the positional relationship between the second element and the third element, when the prescribed axes cannot be determined on the basis of the first element and the second element.

In this invention, the processing section changes the shape of the first element and the second element about a normal to these elements, and when the first element and the second element lie on a straight line, it changes the shape about a normal to the second element and the third element.

In an image processing method whereby a prescribed object is displayed whilst being moved, this invention comprises: a first step whereby, with respect to a first element, a second element and a third element which are mutually linked and form the object, the shape of the first element and the second element are changed about prescribed axes; and a second step whereby processing is conducted on the basis of the positional relationship between the second element and the third element, when the prescribed axes cannot be determined on the basis of the first element and the second element.

In this invention, the first step changes the shape of the first element and the second element about a normal to these elements, and the second step changes the shape about a normal to the second element and the third element, when the first element and the second element lie on a straight line.

This invention is a recording medium whereon programs for causing the aforementioned processing steps to be implemented in a computer are recorded.

In an image processing device which displays a prescribed object whilst changing its shape, this invention comprises: presentation control means for controlling the presentation of an image containing the object which changes in shape; viewpoint determining means for determining the position of a viewpoint for capturing an image containing the object by means of the presentation control means; and recording means for recording an image obtained from the viewpoint determined by the viewpoint determining means.

The presentation control means controls, for example, changes in the shape of an object wherein a single person, or the like, is taken as a object. The object is composed on the basis of polygon data, for example. The presentation control means changes the vertex coordinates for each polygon data as time passes, and changes the movement of the whole object.

The viewpoint determining means determines, for example, the position (viewpoint) of a camera capturing an image of this object in a virtual space. The position of this viewpoint is determined on the basis of the operations of the game player.

The recording means records, for example, images in a virtual space taken from the aforementioned viewpoint, as image data in a time series.

In this invention, the presentation control means changes the shape of the object on the basis of data obtained by capturing the movement of each part of an object moving in a real space. For example, if the object is a person, then it captures the movement of this person and changes the shape of the object such that it performs a movement simulating the movement of a person.

In this invention, the presentation control means uses texture data obtained by scanning a portion of the object by means of a three-dimensional scanner as texture data for a portion of the object. For example, if the object is to simulate the shape of a particular person, then that person's face is input by means of a three-dimensional scanner and used as texture data for the portion of the object corresponding to the face.

In this invention, the presentation control means selects, on the basis of the player's operations, the shape of the object, the pattern of change in this object, the type of texture data applied to this object, or the type of sound emitted when the object changes shape. If the object is a person, then, for example, the shape may correspond to the physical shape of that person, the changes in shape, to the pattern in which that person is dancing, and the texture data, to the clothing that the person is wearing. The type of sound corresponds to the music that the person is dancing to.

In this invention, the presentation control means displays at least one other object which is different to the object, and changes the shape of this other object also. For example, if the object is a person, then the other object may correspond to a dancing girl who is dancing behind this person.

In this invention, the presentation control means conducts a presentation wherein prescribed illumination is provided in accordance with changes in the shape of the object. For example, in a case where the object is modeled on a dancing person, the illumination may comprise multi-coloured lighting, spotlights and flash lights. Moreover, the image may also be such that beams of light are transmitted from a portion of the object depicting a person. Illumination simulating fireworks may also be displayed.

In this invention, the presentation control means conducts a presentation wherein a prescribed image pattern appears in a position corresponding to the foreground or background of the object, in accordance with the change in the shape of the object. For example, the image pattern may be a texture pattern corresponding to a stage or scenery, or a pattern simulating smoke, or a pattern containing shooting stars.

In this invention, the recording means can pause recording of the image on the basis of the player's operations, and the presentation control means can change the presentation of this image whilst the recording of the image is paused by the recording means. Since the recording is paused whilst the presentation is changed, when the image ultimately recorded by the recording means is reproduced, the scene changes at the point where recording was paused. In this way, a visual effect is obtained whereby the presentation of the image is altered each time the scene changes.

In this invention, the viewpoint determining means changes the relative position information of the viewpoint to the object on the basis of the player's operations. For example, if the object simulates a dancing person, a visual effect is obtained which is similar to that taken by a single camera which moves whilst looking at the person.

In this invention, the recording means pauses the recording of the image on the basis of the player's operations, and the viewpoint determining means changes the position of the viewpoint whilst the recording of the image is paused by the recording means. According to this invention, since the camera angle can change each time the scene changes, a rapid visual effect similar to switching of images in a commercial broadcast where a stage is filmed by a plurality of cameras, can be provided.

In this invention, the recording means reproduces a recorded series of images at the same speed as that used when recording these images.

In this invention, the recording means reproduces a recorded series of images at a different speed to that used when recording these images. For example, fast forward, pause operations, or the like, are possible.

In this invention, the recording means reproduces a recorded series of images in a different sequence to that used when recording these images. For example, reverse playback, repeat playback, loop playback, and the like, are possible.

In an image processing device, wherein said virtual space has an inhibited area in which said viewpoint can not be located, and said viewpoint determining means changes said viewpoint position information out of said inhibited area.

In an image processing method for displaying a prescribed object whilst changing the shape of the object, this invention comprises: a presentation control step for controlling the presentation of an image containing the object which changes in shape; a viewpoint determining step for determining the position of a viewpoint for capturing an image containing the object by means of the presentation control step; and a recording step for recording images obtained from the viewpoint determined by the viewpoint determining step.

This invention is a recording medium whereon programs for causing the aforementioned processing steps to be implemented in a computer are recorded.

In a game image display method for displaying images wherein an object located in a virtual space is captured from a certain viewpoint, this invention comprises the steps of: positioning a first object and a second object in the virtual space such that the second object is rotatable in one direction with respect to the first object, whilst its rotation in the other direction is restricted; inserting an elastic object between the first and second objects, which expands and contracts such that no gap is produced between the first and second objects with the rotation of the second objects; preparing data for the elastic object such that the elastic object has a larger surface area on the side of the smaller angle formed between the first and second objects when the second object is rotated with respect to the first object, than its surface area on the opposite side.

BRIEF DESCRIPTION OF THE DRAWINGS

FIG. 16 is a simple example of a object wherein vertices are shared relating to a first mode for implementing the present invention;

FIG. 17 is a simple example of a object wherein vertices are shared relating to a first mode for implementing the present invention;

FIG. 18 shows one example of application to the case of a human being relating to a first mode for implementing the present invention;

FIG. 19 is an illustrative diagram of movement of a human head relating to a first mode for implementing the present invention;

FIG. 20 is an illustrative diagram of conventional movement of a human head;

FIG. 38 is a an example of a facial object comprising polygons onto which an input image is applied, relating to a third mode for implementing the present invention;

BEST MODE FOR CARRYING OUT THE INVENTION

First mode for implementing the invention

Composition

Figure 1:
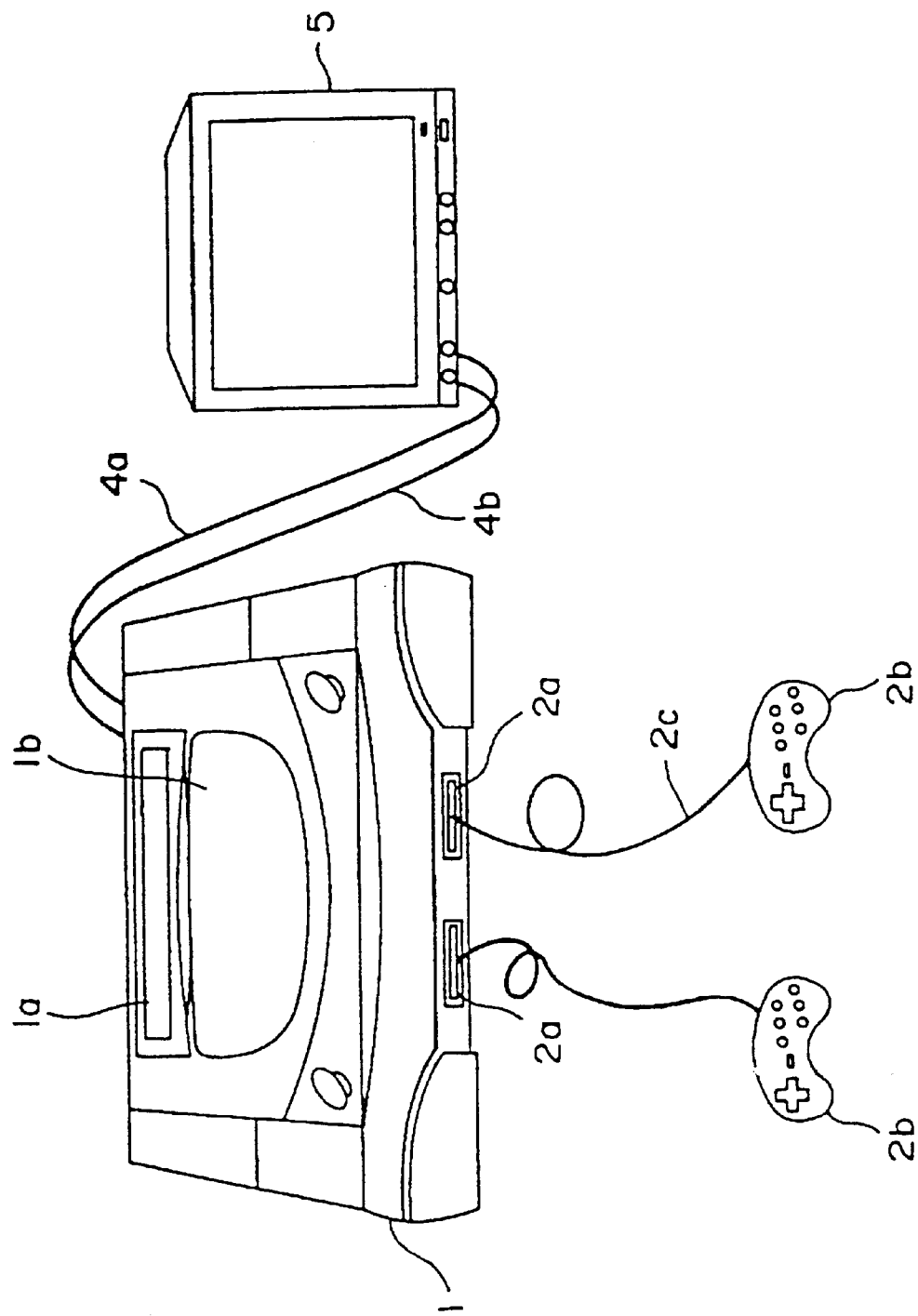
FIG. 1 is an external view of a video game machine relating to a first mode for implementing the present invention.

FIG. 1 is an external view of a video game machine incorporating an image processing device relating to a mode of implementing the present invention. In this diagram, the video game machine main unit 1 is approximately box-shaped, and is provided internally with circuit boards and the like for game processing. Two connectors 2a are provided at the front of the video game machine main unit 1, and PADs 2b for operating games are connected to these connectors 2a via cables 2c. If two people are playing a game, then two PADs 2b are connected.

A cartridge I/F 1a and a CD-ROM drive 1b for reading CD-ROMs are provided on the top of the video game machine main unit 1. Although not shown in the diagram, a video output terminal and audio output terminal are provided at the rear of the video game machine main unit 1. This video output terminal is connected via a cable 4a to the video input terminal of a TV receiver 5, whilst the audio output terminal is connected via a cable 4b to the audio input terminal of a TV receiver 5. In a video game machine of this kind, by operating the PADs 2b, users are able to play a game whilst watching screens depicted on the TV receiver 5.

Figure 2:
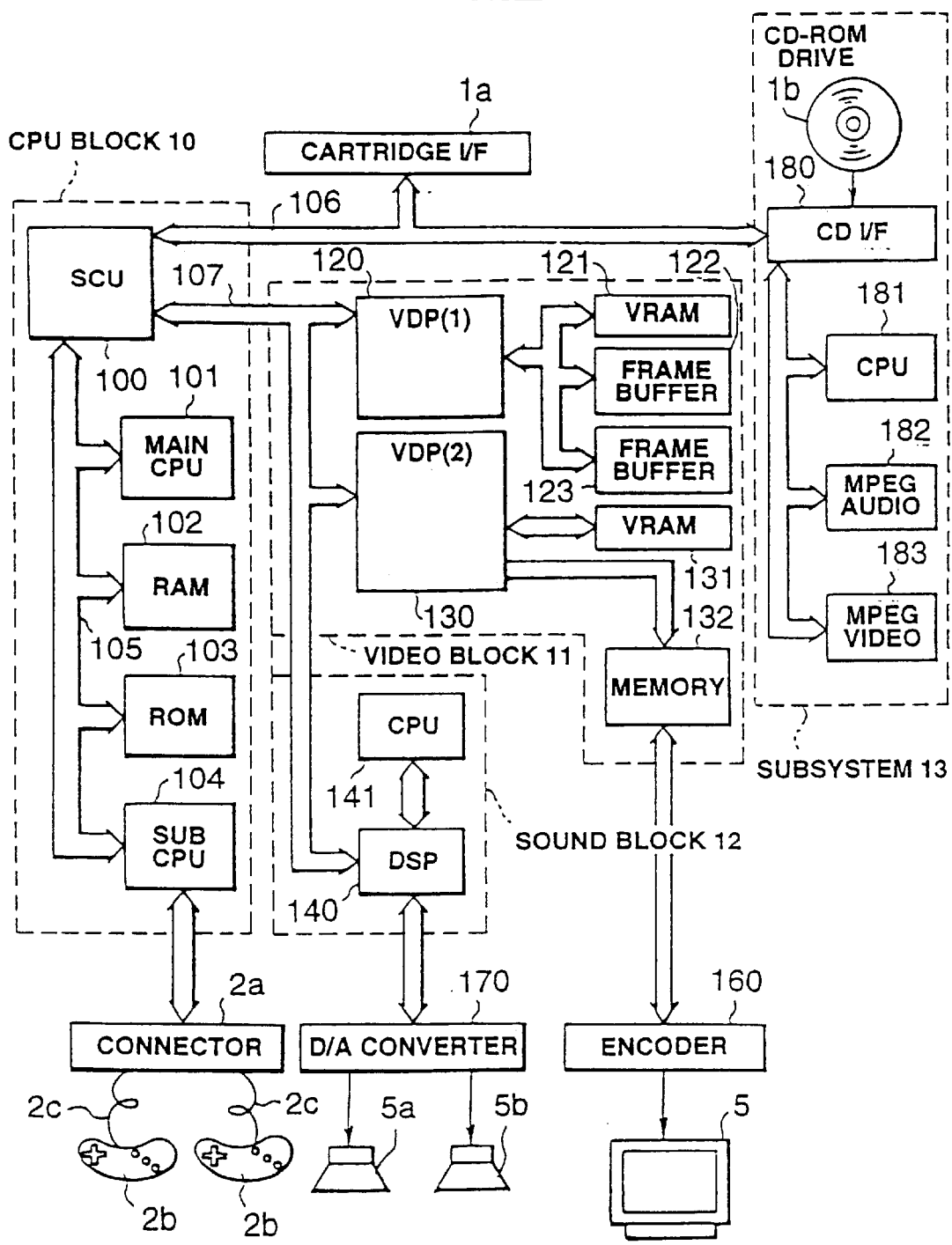
FIG. 2 is an approximate compositional view of a video game machine relating to a first mode for implementing the present invention.

FIG. 2 is a block diagram showing an overview of a video game device relating to the present mode of implementation. This image processing device comprises a CPU block 10 which controls the whole device, a video block 11 which controls the display of game screens, a sound block 12 which generates sound effects etc., and a sub-system 13 which reads out CD-ROMs, and the like.

The CPU block 10 comprises: an SCU (System Control Unit) 100; a main CPU 101; RAM 102; ROM 103; cartridge I/F 1a; sub-CPU 104; CPU bus 105; and the like. The main CPU 101 controls the whole device. This main CPU 101 is provided with an internal calculating function similar to a DSP (Digital Signal Processor), and it is capable of implementing applicational software at high speed. The RAM 102 is used as a work area for the main CPU 101. The ROM 103 stores a portion of polygon data and initial programs and the like for initialization processing. The SCU 100 conducts smooth data input and output between the main CPU 101, VDPs 120, 130, a DSP 140, and a CPU 141, and the like, by controlling buses 105, 106 and 107. The SCU 100 is also provided internally with a DMA controller, and it is capable of transferring sprite data from the game to a VRAM in the video block 11. Thereby, applicational software, such as a game, can be implemented at high speed. The cartridge I/F 1a is used for inputting applicational software supplied in ROM cartridge format.

The sub-CPU 104 is known as an SMPC (System Manager & Peripheral Control), and it is provided with a function for gathering peripheral data from the PADs 2b via the connectors 2a, in accordance with the requirements of the main CPU 101. The main CPU 101 conducts processing on the basis of the peripheral data received from the sub-CPU 104. Any peripheral from a PAD, joystick, or keyboard etc. can be connected to the connectors 2a. The sub-CPU 104 is provided with a function whereby it automatically identifies the type of peripheral connected to the connectors 2a (main unit terminals) and gathers peripheral data and the like according to a communications format corresponding to the type of peripheral.

The video block 11 is provided with a VDP (Video Display Processor) 120 which draws objects etc. consisting of video game polygon data, and a VDP 130 which draws background screens, synthesizes polygon image data and background images, and performs image clipping, and the like. The VDP 120 is connected to a VRAM 121, and frame buffers 122, 123. Polygon picture data representing an object in the video game device is transferred from the main CPU 101 via the SCU 100 to VDP 120, and it is written into VRAM 121. The picture data written into VRAM 121 is then drawn into picture frame buffer 122 or 123 in a 16 or 8 bit/pixel format, for example. The data drawn into frame buffer 122 or 123 is transferred to VDP 130. Information for controlling drawing is supplied from the main CPU 101 via the SCU 100 to VDP 120, which implements the drawing process in accordance with these instructions.

VDP 130 is connected to a VRAM 131, and is composed such that image data output from VDP 130 is transferred via a memory 132 to an encoder 160. The encoder 160 generates a video signal by appending a synchronizing signal, or the like, to this image data, and it outputs this signal to the TV receiver 5. Thereby, game screens are displayed on the TV receiver 5.

The sound block 12 comprises a DSP 140 which conducts sound synthesis by means of a PCM system or FM system, and a CPU 141 which controls this DSP 140, and the like. Sound data generated by the DSP 140 is converted to a two-channel signal by a D/A converter 170 and is then output to speakers 5b.

The sub-system 13 comprises a CD-ROM drive 1b, a CD I/F 180, CPU 181, MPEG AUDIO 182, MPEG VIDEO 183, and the like. This sub-system 13 is provided with a function whereby applicational software supplied in CD-ROM format is input and animated images are reproduced, and the like. The CD-ROM drive 1b reads data from a CD-ROM. The CPU 181 controls the CD-ROM drive 1b and conducts error correction processing and the like on the input data. The data input from the CD-ROM is supplied via the CD I/F 180, bus 106 and SCU 100, to the main CPU 101, where it is used as applicational software. Furthermore, the MPEG AUDIO 182 and the MPEG VIDEO 183 are devices for restoring data compressed according to MPEG standards (MPEG: Motion Picture Expert group). By using the MPEG AUDIO 182 and the MPEG VIDEO 183 to restore MPEG compressed data written on a CD-ROM in this way, it is possible to reproduce animated images.

Principles of operation

Next, the principles of operation of an image processing device and image processing method according to a first mode for implementing the present invention are described with reference to the drawings.

Firstly, the concept of polygons used to represent an object in a video game machine is described.

By repeating the operation of determining a display position for, and then displaying, each polygon, it is possible to represent a whole object. The position of each polygon within a single part is defined by a body coordinates system which takes one point in that part as a coordinates origin point. The position of each part within the virtual space is defined by a world coordinates system which takes one point in this virtual space as a coordinates origin point. Since each part has a fixed shape, provided that the position of a part within the world coordinates system is found, then the positions within the world coordinates system of each of the polygons constituting that part can be defined together in a single operation. In order to represent movement of the object, the position within the world coordinates system of each part constituting the object is defined for each interval period, thereby forming motion data. Each polygon is represented by defining as coordinate values the positional coordinates of each vertex of that polygon in the body coordinates system. Here, a set of coordinates for each vertex of a polygon is called "polygon data". It is also possible to define the position of a polygon directly in terms of the world coordinates system, without using the body coordinates system. In order to aid understanding, the description below concerns a method where polygon data is defined in terms of the world coordinates system.

Table 1 shows an example of definitions of polygon data for a polygon where the number of vertices is n.

TABLE 1

| Px1 | Py1 | Pz1 | Px2 | Py2 | Pz2 | ... | Pxn | Pyn | Pzn |
| --- | --- | --- | --- | --- | --- | --- | --- | --- | --- |

Thus, Table 1 shows polygon data for a polygon having n vertices. Px, Py and Pz respectively define the X coordinate, Y coordinate and Z coordinate in the world coordinates system, and the suffix indicates the vertex number.

The polygon data illustrated in Table 1 shows coordinate values for a reference position in a world coordinates system. If a moving object is represented, then the coordinates in the polygon data in Table 1 are converted on the basis of motion data indicating the relative movement position of each part. Moreover, in order to convert to a screen coordinates system viewed from a viewpoint, field of view conversion is carried out on the basis of viewpoint data indicating the position of the viewpoint.

Figure 3:
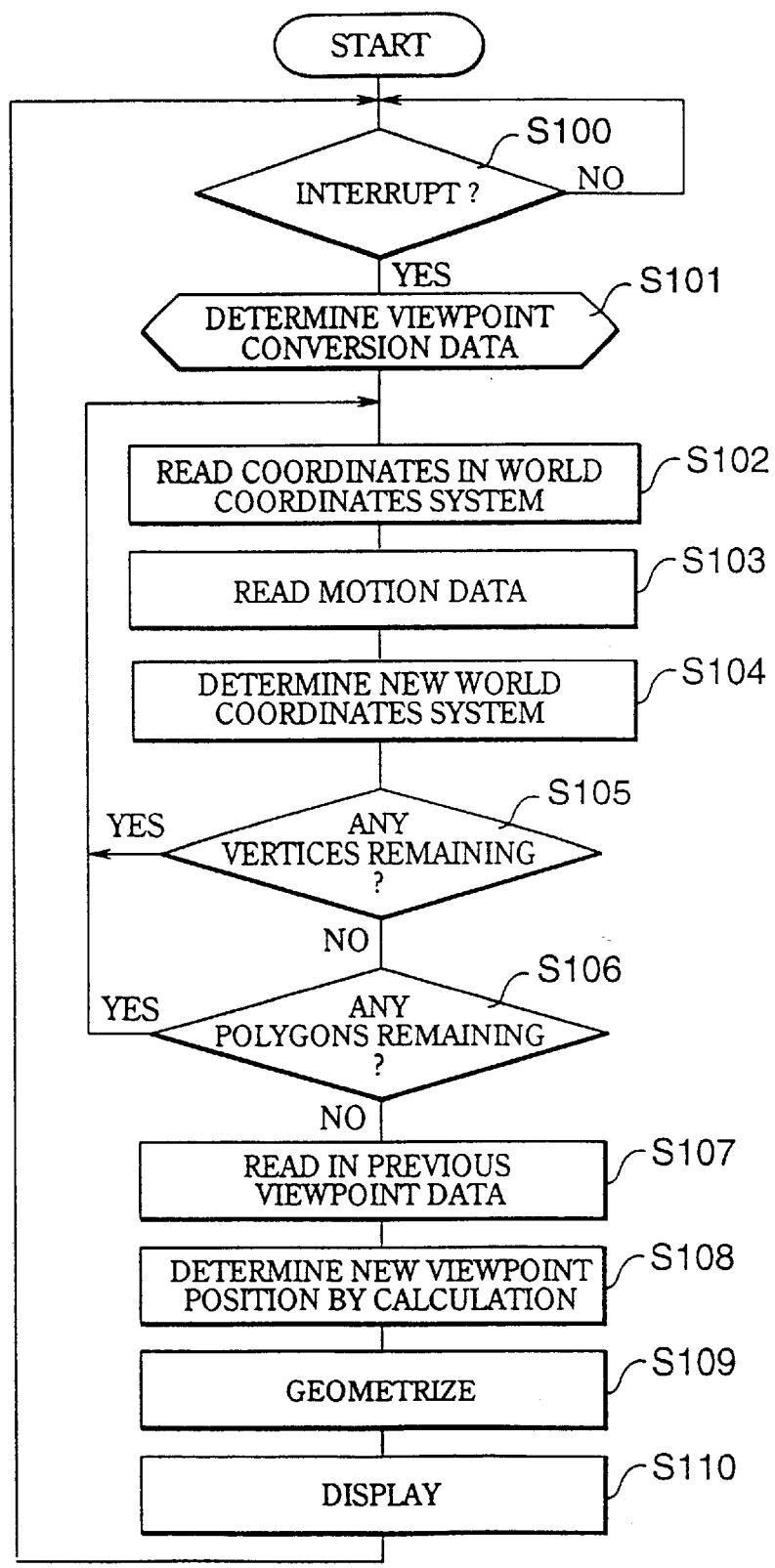
FIG. 3 is a flowchart describing a polygon model display method.

FIG. 3 shows a general display procedure for polygons. The coordinates are converted each time the CPU transmits an interrupt request corresponding to the data update timing (S100; YES). The amount of change required to move to the new viewpoint is determined on the basis of the viewpoint change contents indicated by the program or by an operating signal transmitted by the pads (S101).

When the pre-processing described above has been completed, coordinates in the world coordinates system are gathered by reading polygon data stored in the ROM as shown in Table 1 (S102). Thereupon, motion data determined by the program or by an operating signal input by the user is gathered (S103). The coordinates in the polygon data defined in terms of the world coordinates system are then converted in accordance with the motion data, thereby determining new positional coordinates for the polygon in the world coordinates system (S104). If there still remain vertices for which coordinate conversion has not been completed, (S105; YES), the coordinate conversion process is repeated (S102–S104). If coordinate conversion has been completed for all vertices (S105; NO), then a new display position can be specified for the polygon. This processing (S102–S105) is repeated as long as there remains a polygon which is still to undergo coordinate conversion (S106; YES).

When coordinate conversion has been completed for all the polygons (S106; NO), field of view data indicating the viewpoint position used in field of view conversion in the previous cycle of processing is gathered (S107). Viewpoint data specifying a new viewpoint position is calculated based on the amount of movement of the viewpoint as determined in step S101 (S108). The polygon data specifying the new polygon positions, and the new viewpoint data is transferred to a geometrizer (VDP), which converts the data to a screen coordinates system by means of perspective conversion (S109). When a display is created on the basis of the converted data, it is possible to display polygons which have moved (S110).

Conventionally, the polygons each have a fixed shape as determined by the polygon data. However, in the present invention, by determining the vertex coordinates defining a polygon in relative terms, the expansion and contraction of natural tissue is simulated by applying polygons which expand and contract in shape to the joint regions, and the like, of a object. Below, these polygons which change shape are termed "elastic polygons", and polygons having a fixed shape as in the prior art are termed "inelastic polygons".

The vertex coordinates of elastic polygons are determined in relative terms. In other words, the spatial positions of inelastic polygons bordering an elastic polygon are determined, and these vertex coordinates for the inelastic polygons are used as a reference for determining the coordinates for the elastic polygon. In this way, since the vertex coordinate values for elastic polygons are determined by referring to the vertex coordinates of adjacent polygons, the positional coordinates for the elastic polygons are determined in relative terms.

Below, in order to aid understanding, the polygon display method according to the present mode is described in comparison with a conventional polygon display method.

Conventional polygon display method

Figure 4:
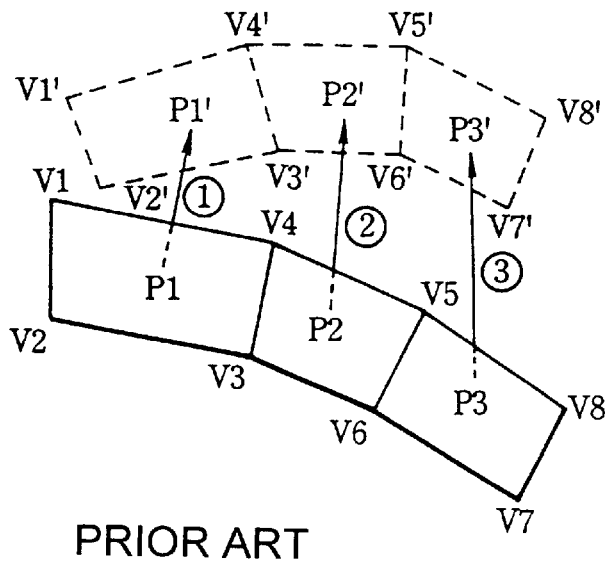
FIG. 4 is a diagram describing the movement of the spatial position of a conventional polygon model.

FIG. 4 illustrates conventional polygons which move to new spatial positions on the basis of motion data. To simplify the description, only three polygons P1–P3 are used in the example. The polygons P1–P3 have relative positions for fixed vertices. The polygon data for P1 indicates vertex coordinates for four vertices v1–v4. Similarly, the polygon data for P2 indicates vertex coordinates for vertices v4–v6, and the polygon data for P3 indicates vertex coordinates for vertices v5–v8. The dotted lines in the diagram illustrate the state of these polygons P1–P3 after moving to new spatial coordinates based on motion data. In order to specify the spatial positions of the polygons P1'–P3' after movement, the coordinates in the polygon data are converted for each polygon to produce new vertex coordinates.

The conventional polygons are all inelastic polygons, and the coordinates for each vertex defined by the polygon data have fixed values. Therefore, movement processing for all the polygons can be carried out by converting coordinates for each polygon. For example, in FIG. 4, calculation is conducted in the order indicated by numbers (1), (2), (3), from coordinate conversion for polygon P1, to display processing for polygon P1', to coordinate conversion for polygon P2, to display processing for polygon P2', to coordinate conversion for polygon P3, to display processing for polygon P3'.

Figure 5:
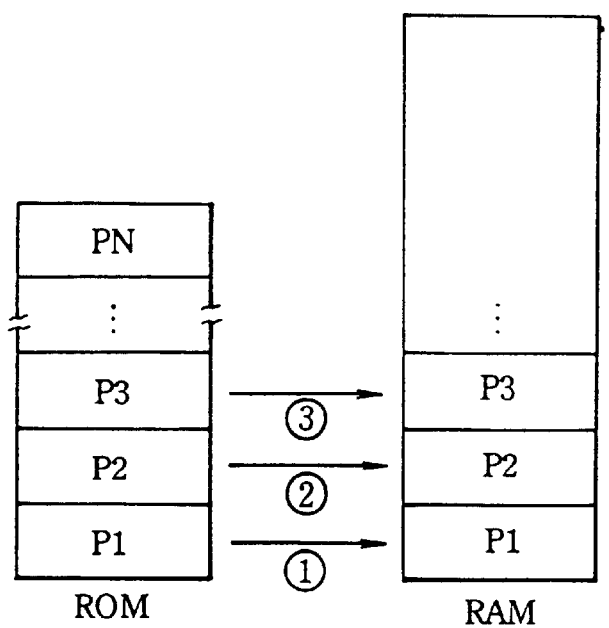
FIG. 5 is a ROM or RAM memory map in a conventional display method.

FIG. 5 shows a memory map in a conventional image processing device. P1, P2, . . . , PN represent polygon data for each polygon. The polygon data is normally stored in a ROM. In order to generate new coordinates in a world coordinates system on the basis of the polygon data, calculation for coordinate conversion (movement and rotation) is carried out on the basis of motion data, and the calculation results are stored in a RAM. As depicted in FIG. 5, if coordinate conversion is conducted in the order shown in FIG. 4, then calculations are conducted in the order (1), (2), (3), and the results are stored successively in the RAM.

Display method for new polygon model

Figure 6:
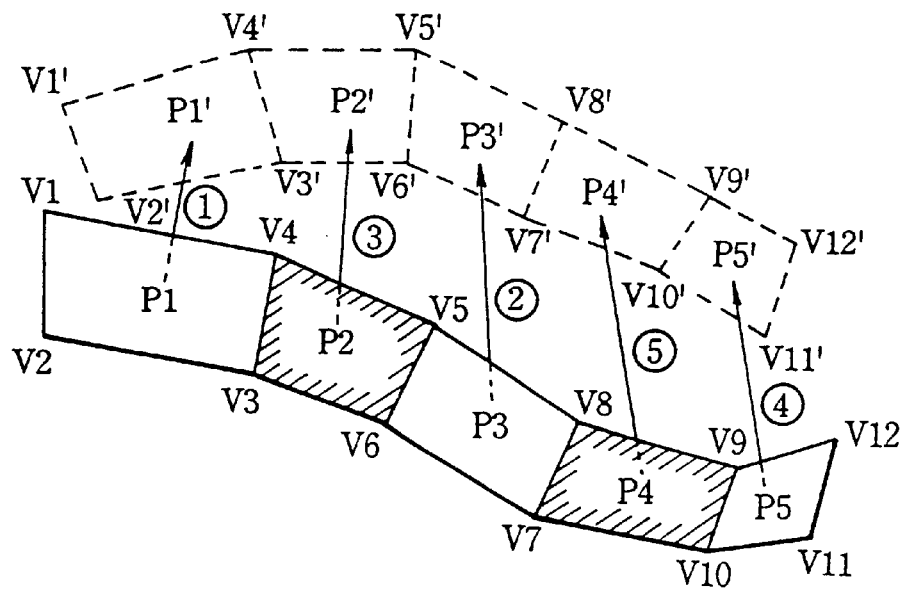
FIG. 6 is a diagram describing the movement of the spatial position of a new polygon model.

FIG. 6 illustrates movement of spatial positions in an object using elastic polygons according to the present invention. In FIG. 6, polygons P2 and P4 marked by diagonal hatching are elastic polygons, and the other polygons P1, P3 and P5 are conventional inelastic polygons. The vertex coordinates of the elastic polygons are defined as relative values. In other words, elastic polygons are defined by referring to the vertex coordinates of the inelastic polygons which have a fixed shape. Therefore, as illustrated in FIG. 6, the coordinates for polygon P2' can be defined by referring to vertices v3' and v4' of inelastic polygon P1' and vertices v5' and v6' of inelastic polygon P3'. The coordinates for polygon P4' are defined by referring to vertices v7' and v8' of inelastic polygon P3' and vertices v9' and v10' of inelastic polygon P5'.

When there are inelastic polygons, the order in which coordinates are converted is important. As indicated by numbers (1), (2), (3), (4), (5) shown in FIG. 6, the order of calculation proceeds from coordinate conversion for polygon P1, to display processing for polygon P1', to coordinate conversion for polygon P3, to display processing for polygon P3', to coordinate conversion for polygon P2, to display processing for polygon P2', to coordinate conversion for polygon P5, to display processing for polygon P5', to coordinate conversion for polygon P4, to display processing for polygon P4'.

Figure 7:
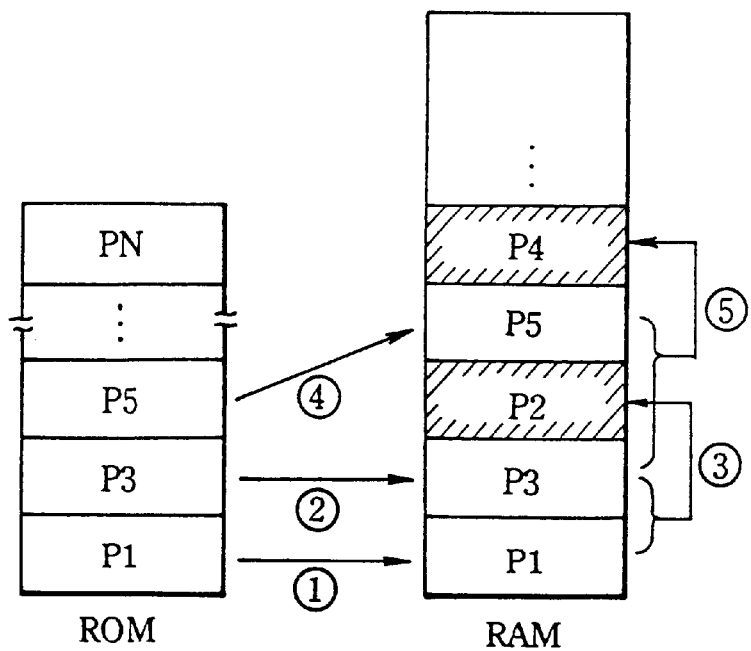
FIG. 7 is a ROM or RAM memory map in a new display method.

FIG. 7 shows a memory map for a new polygon model according to the present invention. Polygon data for inelastic polygons only is stored in the ROM 103. For example, as indicated by the order of the numbers (1)–(5) in FIG. 7, firstly, coordinate conversion is conducted for inelastic polygons P1 and P3 ((1), (2)), whereupon elastic polygon P2' is defined by referring to the coordinates of P1' and P3' ((3)). Coordinate conversion is then carried out for inelastic polygon P5 ((4)), whereupon elastic polygon P4' is defined by referring to the coordinates of P3' and P5' ((5)).

A display method using a new polygon model in this way is characterized in that the operations of converting coordinates from the ROM to the RAM, and referring to coordinates in the RAM and storing coordinates therein, are repeated alternately.

It is difficult to specify which parts of an object are to be represented by elastic polygons. If they are not specified appropriately, it is unlikely that a natural representation will be achieved. A conceivable method for this is one wherein parts of a object (person, animal, etc.) which expand and contract, for example, knees or elbows, are determined in advance. This method is described later.

Figure 8:
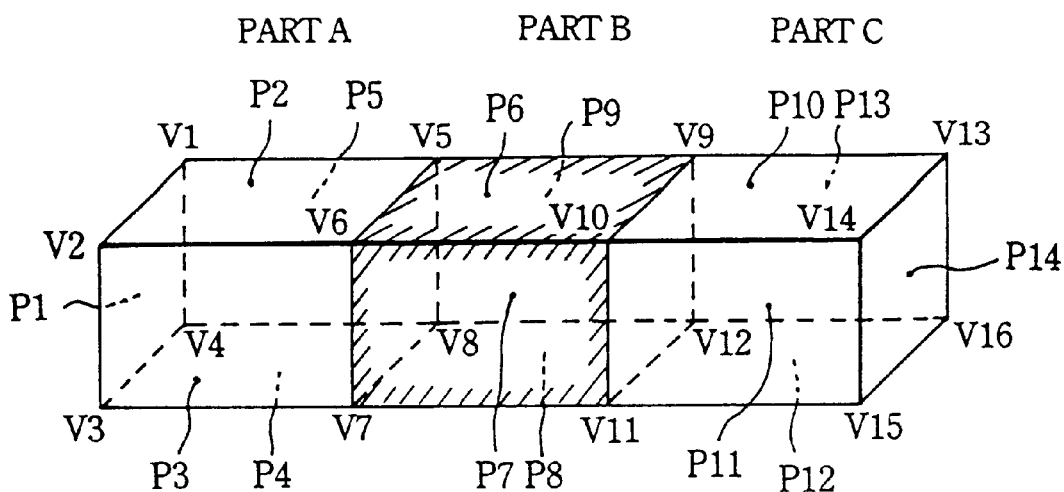
FIG. 8 is a diagram illustrating the state of a three-dimensional model before movement.

FIG. 8 is an illustrative diagram of coordinate calculation between parts constituted by inelastic polygons, and a joint region, or the like, constituted by an elastic polygon.

In FIG. 8, part A and part C comprise inelastic polygons, and part B comprises an elastic polygon. Part A comprises polygons P1–P5 and vertices v1–v8. Part B comprises polygons P6–P9 and vertices v5–v12. Object C comprises polygons P10–P14 ad vertices v9–v16. As FIG. 8 illustrates, part A and part B share four vertices (v5, v6, v7, v8) and part and B and part C share four vertices (v9, v10, v11, v12).

Figure 9:
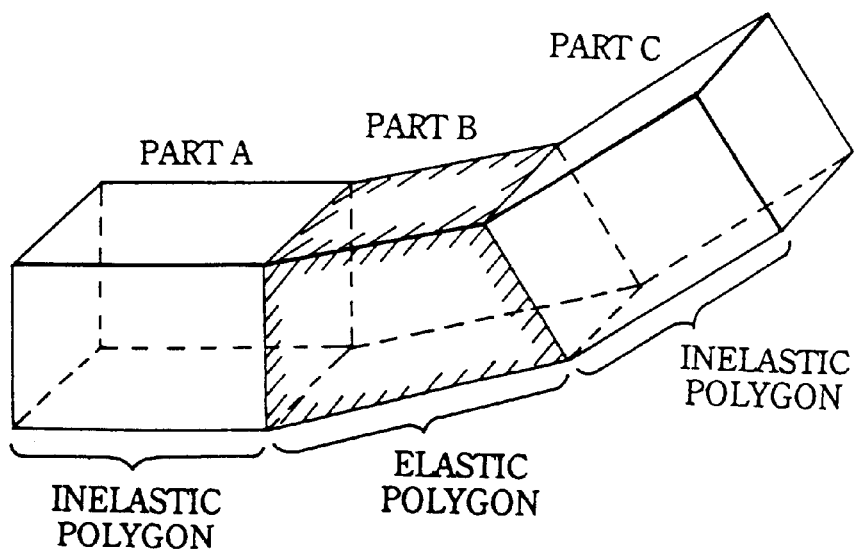
FIG. 9 is a diagram illustrating the state of a three-dimensional model after movement.

FIG. 9 shows an example where the object in FIG. 8 has changed shape and the spatial positions of each part have changed. As the diagram shows, even if the spatial positions of the parts move, the individual shapes of part A and part C comprising inelastic polygons do not change. On the other hand, part B which comprises elastic polygons defined by vertices v5–v8 of part A and vertices v9–v12 of part C contracts and expands and changes from its original shape.

Figure 10A:
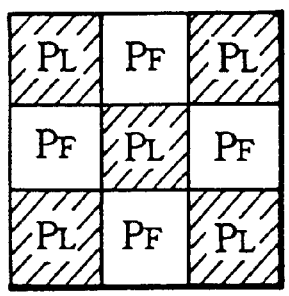
FIG. 10 is a modification wherein polygons which expand and contract are employed.
Figure 10B:
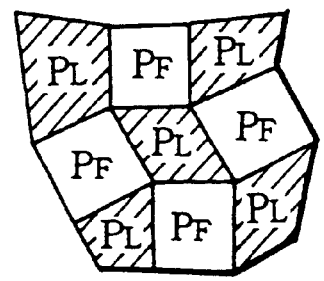

In the example described above, inelastic polygons are positioned only on two edges of the elastic polygon, but as shown in FIG. 10, it is also possible for an elastic polygon to be surrounded by inelastic polygons. In this diagram, polygons marked by diagonal hatching and the symbol PL are elastic polygons, and polygons marked PF are inelastic polygons. The spatial positions change from their original shape in FIG. 10A to the shape shown in FIG. 10B. The shape of the elastic polygons PL changes, but the shapes of the inelastic polygons PF are fixed.

Therefore, whatever shape the polygons have, elastic polygons can be defined in areas between inelastic polygons.

Method for referring to coordinates in new polygon model

A method for referring to coordinates according to the present mode is now described, taking as an example the relationship between part A and part B in the polygon model shown in FIG. 8.

Firstly, the vertex buffers for part A and part B are as shown below.

| Part A vertex buffer (Vertex-A) | Part B vertex buffer (Vertex-B) |
|---|---|
| [0]point v1 | [0]point v5 |
| [1]point v2 | [1]point v6 |
| [2]point v3 | [2]point v7 |
| [3]point v4 | [3]point v8 |
| [4]point v5 | [4]point v9 |
| [5]point v6 | [5]point v10 |
| [6]point v7 | [6]point v11 |
| [7]point v8 | [7]point v12 |

Here, Vertex-X(x,x,x,x) is the vertex buffer index.

The polygon buffers for part A and part B are as follows.

| Part A polygon buffer (Polygon-A) | Part B polygon buffer (Polygon-B) |
|---|---|
| Vertex-A(0, 1, 2, 3) | Vertex-B(0, 1, 2, 3) |
| Vertex-A(0, 1, 4, 5) | Vertex-B(0, 1, 4, 5) |
| Vertex-A(1, 2, 5, 6) | Vertex-B(1, 2, 5, 6) |
| Vertex-A(2, 3, 6, 7) | Vertex-B(2, 3, 6, 7) |
| Vertex-A(0, 3, 4, 7) | Vertex-B(0, 3, 4, 7) |
| Vertex-A(4, 5, 6, 7) | Vertex-B(4, 5, 6, 7) |

The above data format is generally used, and since there are vertices in part B (v5, v6, v7, v8) having the same coordinates as vertices in part A, the representation of these vertices in part B is changed so that they refer to the corresponding vertices in part A. Specifically, the polygon data buffer (Vertex-B) is rewritten using negative configuration indices.

| Part A polygon buffer (Polygon-A) | Part B polygon buffer (Polygon-B) |
|---|---|
| Vertex-A(0, 1, 2, 3) | Vertex-B(−4, −3, −2, −1) |
| Vertex-A(0, 1, 4, 5) | Vertex-B(−4, −3, 4, 5) |
| Vertex-A(1, 2, 5, 6) | Vertex-B(−3, −2, 5, 6) |
| Vertex-A(2, 3, 6, 7) | Vertex-B(−2, −1, 6, 7) |
| Vertex-A(0, 3, 4, 7) | Vertex-B(−4, −1, 4, 7) |
| Vertex-A(4, 5, 6, 7) | Vertex-B(4, 5, 6, 7) |

By converting in this way, part B is drawn using the vertices of part A. In a method of this kind using elastic polygons, since the vertices shared by parts A and B are defined as the same vertices, it is possible to obtain an effect whereby, when the parts move, the adjacent polygons and applied texture follow this movement. When this method is used for human parts such as joints, or the like, the polygons and texture can stretch, thus making it possible to display more natural movement. This method can also be applied to parts which it is considered should follow adjacent polygons and texture.

Figure 11:
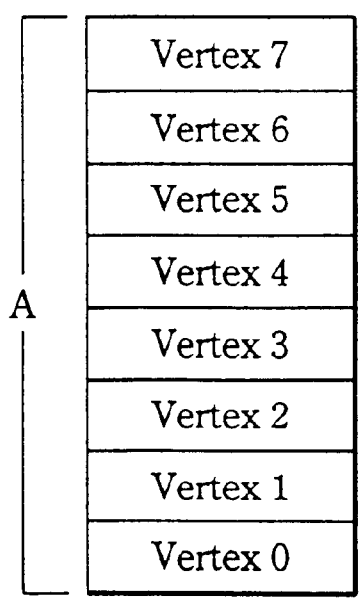
FIG. 11 is a diagram explaining the sharing of vertices relating to a first mode for implementing the present invention.
Figure 12:
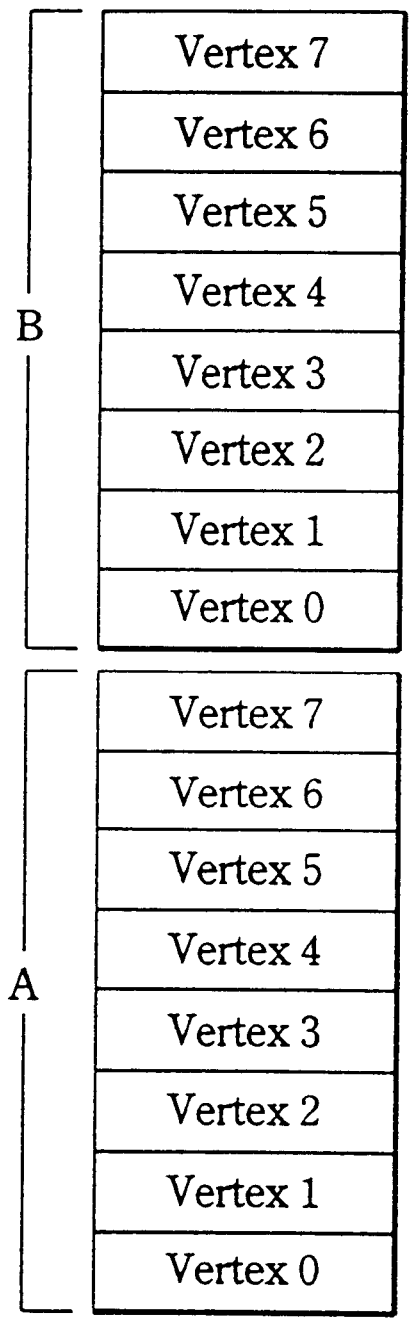
FIG. 12 is a diagram explaining the sharing of vertices relating to a first mode for implementing the present invention.
Figure 13:
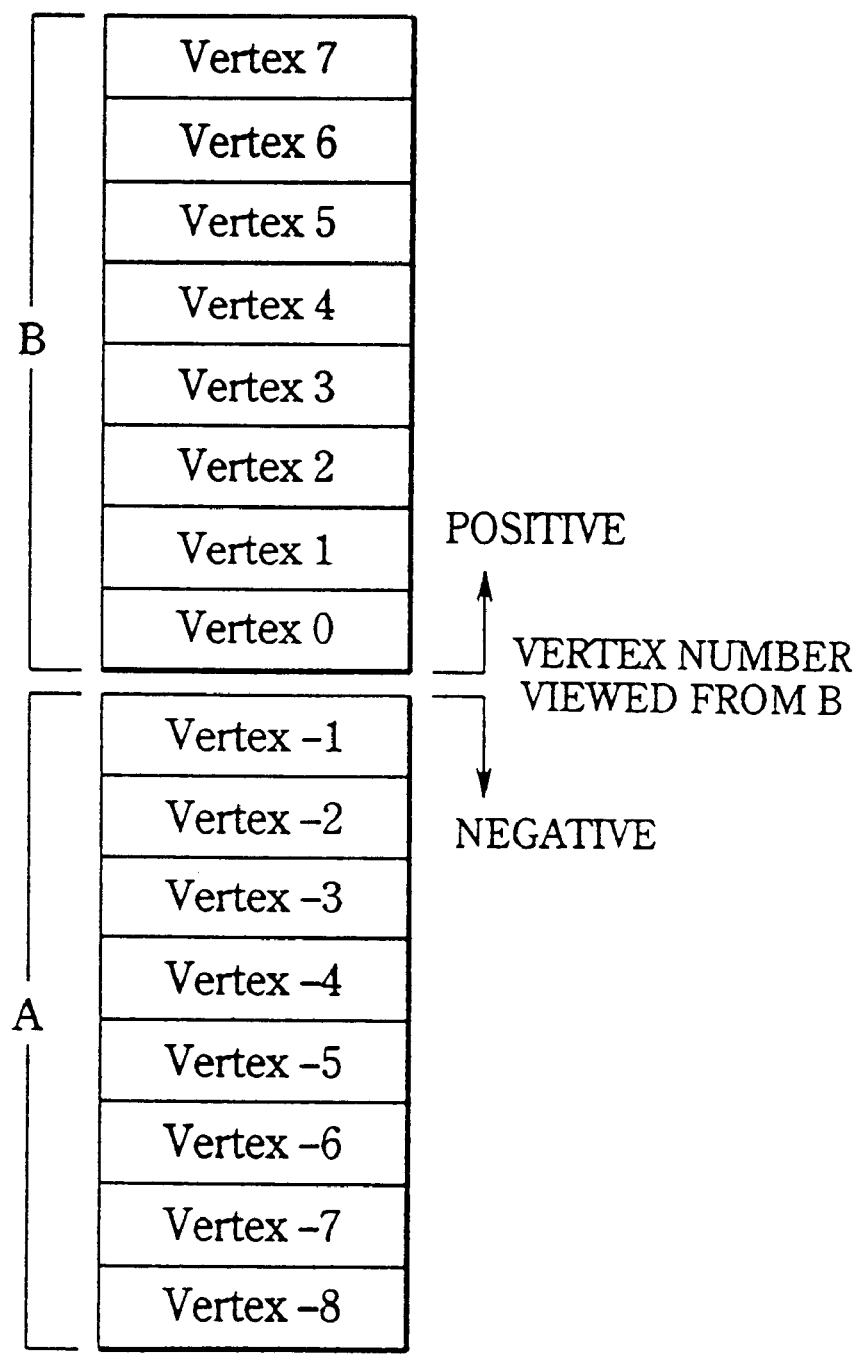
FIG. 13 is a diagram explaining the sharing of vertices relating to a first mode for implementing the present invention.

Next, the technique of vertex sharing is described using FIG. 11–FIG. 13.

Firstly, the vertices of part A to be displayed are calculated three-dimensionally. These results are used later as indices (FIG. 11: vertex buffer).

Thereupon, the vertices of part B to be displayed are calculated three-dimensionally. The calculated vertices are stored in a buffer (FIG. 12).

Data is extracted from this vertex buffer using indices when an image is displayed. FIG. 13 shows the indices extracted from the vertex buffer in the case of a quadrilateral polygon. As shown in FIG. 13, if the vertex number is 0 or positive (Vertex0-Vertex7), then this indicates a new vertex which has not yet been referenced. On the other hand, if the vertex number is negative (Vertex−1-Vertex−8), then this indicates a vertex referenced to a previous part (part A) which has already been referenced. Therefore, if the vertex indices are (0, 1, 2, 3), a polygon can be created using Vertex0, 1, 2, 3. If the index is a negative value, then polygons defined by the vertices of the previous part can be derived for the current part (FIG. 13).

Provided that calculations are made in the correct order, it is possible to represent connected polygons. However, the parts converter must check that the vertices are connected, and a function for changing indices must be added.

Example of object containing shared vertices

A simple example of a object containing shared vertices is now described using FIG. 14–FIG. 17.

Figure 14:
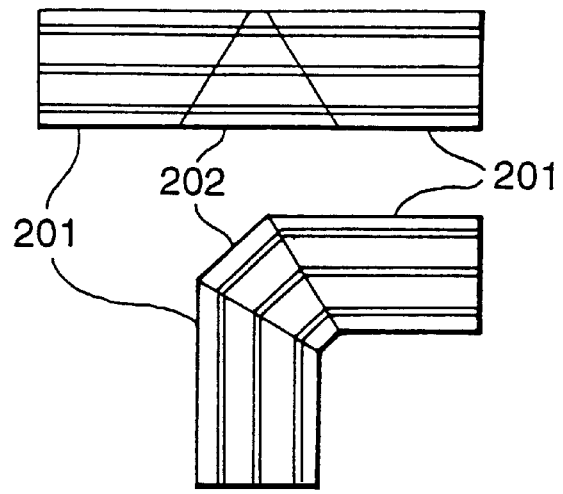
FIG. 14 is a simple example of a object wherein vertices are shared relating to a first mode for implementing the present invention.

In FIG. 14, an elastic polygon 202 is positioned between inelastic polygons 201. If the inelastic polygons 201 bend through 90°, then the inner side of the elastic polygon 201 contracts and the outer side expands. Since the inelastic polygons 202 have oblique ends, there is not a particularly great degree of contraction and expansion in the major axis and the minor axis of the elastic polygon 202 in a perpendicular cross-section to its axial direction (in other words, the thickness of the elbow).

Figure 15:
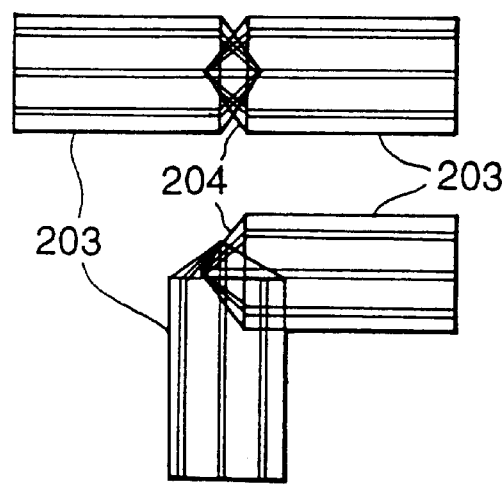
FIG. 15 is a simple example of a object wherein vertices are shared relating to a first mode for implementing the present invention.

FIG. 15 is an example of a conventional object wherein vertices are not connected. By forming the ends of the left- and right-hand parts 203 into points in the region 204 where they overlap, it is possible to prevent this overlapping region 204 from being conspicuous when the parts are bent. However, in a representation method of this kind, it is not possible to represent a uniformly connected skin, or the like.

In FIG. 16, an elastic polygon 206 is positioned between inelastic polygons 205. If the inelastic polygons 205 bend through 90°, the inner side of the elastic polygon 206 contracts and the outer side thereof expands. In an unbent state, the two border lines between the elastic polygon 206 and the inelastic polygons 205 are mutually parallel, so compared to the case in FIG. 14, there is a greater degree of contraction and expansion in the major axis and the minor axis of the elastic polygon 205 in a perpendicular cross-section to its axial direction.

In FIG. 17, an elastic polygon 208 is positioned between inelastic polygons 207. FIG. 17B shows a state where the inelastic polygons 207 are twisted from their state in FIG. 17A. FIG. 17C shows a state where they are twisted further.

Example of joint model in case of human being

FIG. 18 illustrates a polygon model which is applied a first mode for implementing this invention. FIG. 18A is a front view, FIG. 18B is a side view, and FIG. 18C is a rear view.

In a representation using a conventional polygon model, parts constituted by inelastic polygons are connected at joint regions, and these joints only serve as fulcrums about which the parts can move.

However, in a representation shown in FIG. 18, polygons are located over a whole body as an object. In FIG. 18, polygons, which form regions shown in oblique lines, are constructed with elastic polygons, and the rest of the region is constructed with inelastic polygons. Therefore, whole surface of the model is connected smoothly, and it is possible to produce a natural representation of "bending" or "twisting" of joint regions occurring in an actual human body.

Numeral 209 denotes an inelastic polygon, and numeral 210 denotes an elastic polygon. According to this diagram, a human model is interpolated by linking together virtually all the joints. In other words, 1. Head
2. Torso
3. Shoulders (below armpit only)
4. Elbows
5. Wrists
6. First finger joints (object combining four fingers as well as thumb)
7. Second finger joints
8. Thigh joints (groin)
9. Knees
10. Ankles
11. Toes These 20 joints of 11 different types are formed by elastic polygons.

In conventional joint models, a method is employed wherein parts which are essentially completely separate are superimposed on each other. Using such a method, at the joint regions, the links between each part are conspicuous and a representation having a stiff appearance is produced. However, using a method according to the first mode for implementing this invention, it is possible to restrict any strange appearance in the links, and a more flexible representation can be produced. By connecting joints, it is possible to represent smooth movement and to produce a real-life appearance. Since texture is applied not to each individual part, but rather as a single layer to a plurality of connected parts, smooth linking of coloration, patterning, and the like, is possible. Thereby, a sense of unity between the parts is obtained. Furthermore, since polygons are not used to cover the edges of the parts, there is a saving in the number of polygons.

Characteristic features of elastic polygon models in joint regions include the following:

1. Structure of joint model (see FIG. 8)

When part A (parent) and part B (child) are to be connected, the vertices on an edge of part B are brought to the same position as any of the vertices of part A. These vertices are connected by program processing. The only deformation occurs in the column of polygons on the edge of part B.

2. Connecting elastic polygons and inelastic polygons in single-axis single-side limited rotation model (elbows, knees, etc.)

(1) Example in FIG. 14

In FIG. 14, polygons 201 are inelastic and polygon 202 is elastic. As the diagram shows, if the length of the elastic polygon on the side facing the direction of bending is greater than the length of the elastic polygon on the side facing the opposite direction to the direction of bending, then the length of its edges after bending will be relatively equal compared to example (2) below, and the linking section is not liable to break.

Here, the expression "break" means that the bent area, such as a joint region, assumes an unnatural shape.

(2) Example in FIG. 16

In FIG. 16, numeral 205 denotes inelastic polygons and numeral 206 denotes an elastic polygon. If the two border lines between the elastic polygon 206 and the inelastic polygons 205 are parallel in this way, then the linking section will break, like when a pipe is bent back on itself.

3. Connecting elastic polygons and inelastic polygons in objects performing rotation about three axes (head, torso, wrists, ankles, etc.; see FIG. 19–FIG. 25)

Essentially, in the base position, the two border lines between the elastic polygon and the inelastic polygons are parallel. Since the angle changes symmetrically from the base position, there is left/right symmetry and the angle is changed to a greater or lesser extent depending on the position. When applied to a part involving single-axis, single-side limited rotation, a rupture is unlikely to occur if a wide angle is applied in the direction in which the part can bend. However, a disadvantage is that there is a low limit on y-axis rotation (twisting). Although it depends on the situation, quality is maintained up to the region of 45°, but beyond this, there is conspicuous constriction in the centre. As a result, the elastic polygon assumes an extreme shape and an unnatural representation is obtained.

4. Connecting elastic polygons and inelastic polygons performing special rotation about three axes (e.g. groin, shoulders, etc.; see FIG. 26).

In broad terms, the groin or human thigh joint rotates about three axes: it can bend forwards and backwards, open left and right, and twist.

However, in the forward and backward movement, the leg hardly bends at all in the backward direction, in the opening action, the leg mainly opens outwards, and hardly bends at all in an inward direction, and the twisting action is not particularly great, so this can be seen as a combination of two single-axis single-side limited rotations, plus some twisting rotation. Therefore, the front and outer portions of the joint should be made broad, and the rear and inner portions thereof made narrow, producing a large number of edges which should lie on as smooth a line as possible. A smooth line is required in order to minimize rupturing due to twisting of the polygons. Rupturing due to twisting refers to cases where the surface area of the elastic polygon becomes so small as to create an unnatural appearance, as illustrated in FIG. 17C.

It can be seen that when a object created according to the method described above is moved, if there is either A. backwards/forwards rotation, or B. left/right rotation, then with rotation A, the narrower polygons in direction B, and with rotation B, the narrower polygons in direction A will be liable to rupture. An example of this might be a rupture in the inner thigh joint region due to bending the leg forwards.

When joint region polygons are displayed having two sides, then if a number of the ruptures are not visible to an observer, or are not liable to be seen due to their position, then no particular countermeasures need to be taken with regard to the points mentioned above.

By incorporating the buttock region as a portion of the leg parts, rather than a portion of the body parts, the left- and right-hand sides of the buttock region can move independently, thereby providing lively motion in the image representation.

Next, each section is described in detail.

FIG. 19 is an illustrative diagram of movement of a human head. FIG. 19A shows the state of a head before it is tilted, and FIG. 19B shows the state of the head after tilting left or right. As FIG. 19B shows, since it is possible to tilt the head alone, a more natural representation can be obtained. FIG. 20 shows a case where the first mode of implementing this invention is not applied, and as shown in FIG. 20B, when the head is tilted left or right, the neck rotates with the head.

Figures 21A, 21B:
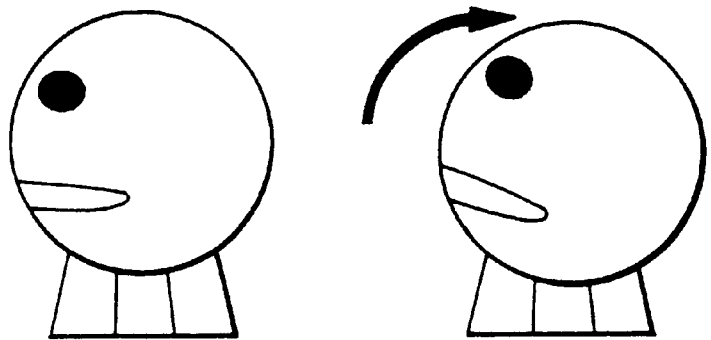
FIG. 21 is an illustrative diagram of movement of a human head relating to a first mode for implementing the present invention.
Figures 22A, 22B:
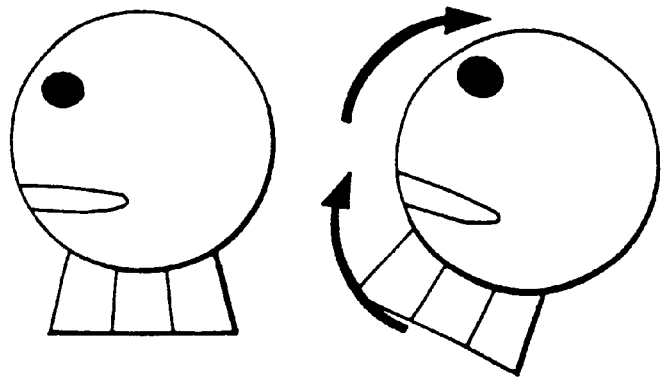
FIG. 22 is an illustrative diagram of conventional movement of a human head.

FIG. 21 is also an illustrative diagram of movement of a human head. FIG. 21A shows the state of a head before it is tilted, and FIG. 21B shows the state of a head after it has been tilted forwards or backwards. As FIG. 21B shows, since it is possible to tilt the head alone, a more natural representation can be obtained. FIG. 22 shows a case where the first mode for implementing this invention is not applied, and as shown in FIG. 22B, when the head is tilted backwards or forwards, the neck rotates with the head.

Next, shoulder movement is described. In a real human body, when an arm is moved in front of the body, it can move freely up and down, and right and left. On the other hand, in some cases an arm also rotates behind the body. Therefore, if the shoulder joint regions are connected by elastic polygons, then when an arm is bent inside the chest region, or behind the body, the elastic polygons will deform to a very large degree, creating an unnatural shoulder shape. Therefore, in order to avoid an unnatural appearance in the shoulder joint regions, inelastic polygons are used in the joint itself and elastic polygons are used in the area surrounding the shoulder.

Figure 23:
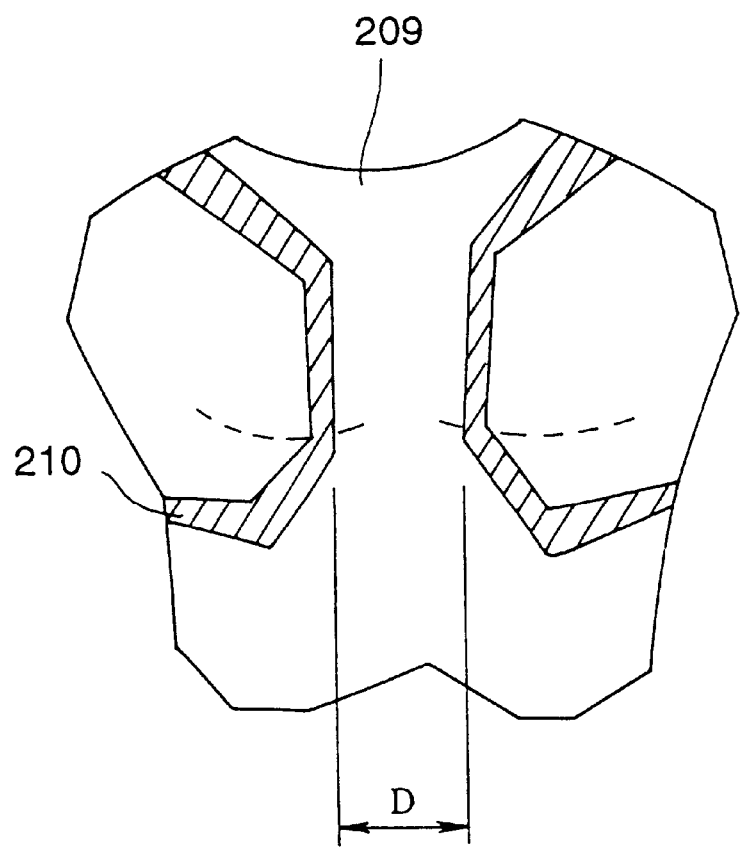
FIG. 23 is an example of the position of polygons in shoulder regions relating to a first mode for implementing the present invention.

An example of the configuration of shoulder region polygons 209, 210 is shown in FIG. 23. When elastic polygons and inelastic polygons are connected at the border between the shoulders and the chest (indicated by dotted lines), due to the elastic polygons 210, strange deformations may occur, so slight adjustment is necessary. The border line between natural and unnatural movement can be seen by slight adjustment of width D in FIG. 23.

Figure 24A:
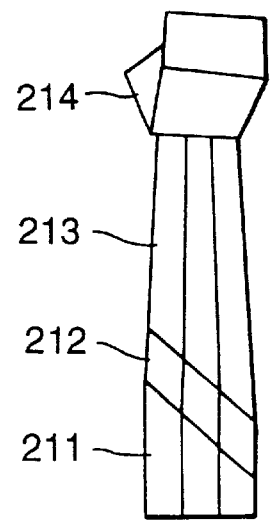
FIG. 24 is an illustrative diagram of movement of a human hand and wrist relating to a first mode for implementing the present invention.
Figure 24B:
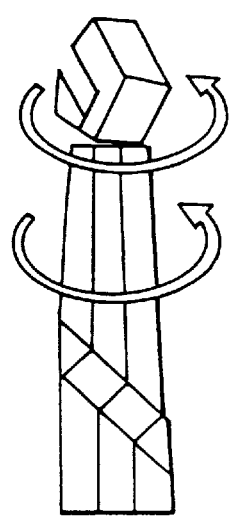
Figure 25A:
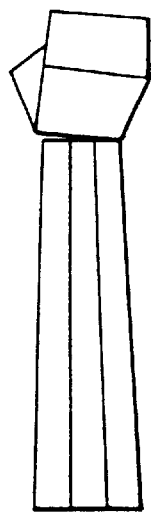
FIG. 25 is an illustrative diagram of conventional movement of a human hand and wrist.
Figure 25B:
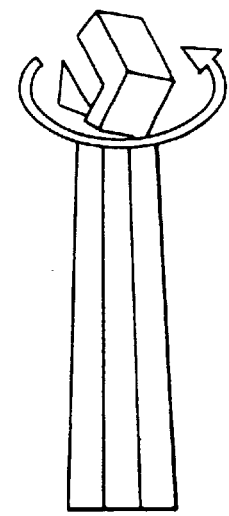

Next, hand movement is described (arm and wrist movement). FIG. 24 is an illustrative diagram of human hand and wrist movement. In FIG. 24, numerals 211–214 denote polygons, and polygon 121 is an elastic polygon. FIG. 24A shows the state of a hand before it is twisted, and FIG. 24B shows the state of a hand after it has been twisted. As FIG. 24B shows, when the hand is twisted, polygon 212 expands, and the arm 213 and wrist 214 turn together, producing a more natural movement. FIG. 25 shows a case where the first mode for implementing this invention is not applied, and as FIG. 25B shows, when the hand is twisted, only the hand rotates, producing an unnatural effect.

Figure 26:
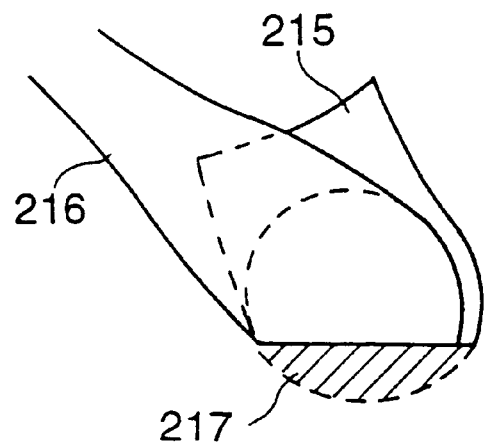
FIG. 26 is an illustrative diagram of movement of a human leg raised high relating to a first mode for implementing the present invention.

Next, waist movement is described. FIG. 26 is an illustrative diagram of the movement of a human leg being raised high in the air. Numeral 215 denotes a waist and numeral 216 denotes a leg. In the motion of raising a leg high in the air, if there is no buttock part 217, then a very flat image is created, so it is desirable if this part 217 is provided in advance.

Example of animal model

Figure 27:
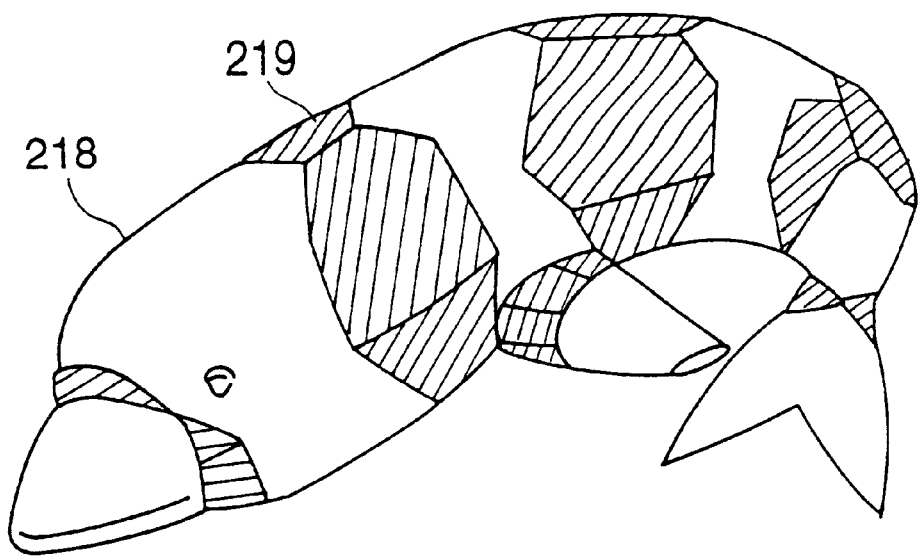
FIG. 27 is an example of application to the case of a dolphin relating to a first mode for implementing the present invention.

FIG. 27 shows an example of a model in the case of a dolphin. In this diagram, numeral 218 denotes inelastic polygons, and numeral 219 denotes elastic polygons. In this case, by creating a bending section 219 which expands and contracts in a forward and backward direction, it is possible to create more natural movement. Needless to say, in the case of an animal also, photographs can be attached to the polygons.

According to the first mode for implementing this invention, the following advantages are obtained.

According to the present mode, it is possible to represent a moving object simply, regardless of the speed at which the object is moving. Furthermore, since only relatively simple coordinate calculations are carried out, a moving object can be represented at real speed using a processing device operating at a fixed speed.

By applying the first mode for implementing the invention to chest and shoulder regions, it is possible to achieve a humanlike representation of an upper body which conveys an impression of movement of the collarbone, chest and back, by means of relatively simple processing.

By representing arms from the armpit to the wrist in two stages, it is possible to represent movement such as a wrist turning over, by means of relatively simple processing.

Since the neck and head can be moved independently, it is possible to achieve a representation which conveys an impression of a neck joint, by means of relatively simple processing.

By forming the toes of a foot as a separate entity, the heel region of the foot and the toes can be moved independently of each other, and it is possible to achieve a representation which conveys an impression of toes, by means of relatively simple processing.

Since the waist can be moved in two stages by dividing the region from the waist to the base of the neck into two stages, it is possible to achieve a representation which conveys an impression of a back joint, by means of relatively simple processing.

Since the wrist is rotated naturally and the arm twists with the wrist, more natural movement is achieved.

Second mode for implementing the invention

Next, a motion capture process relating to a second mode for implementing this invention is described.

Figure 28:
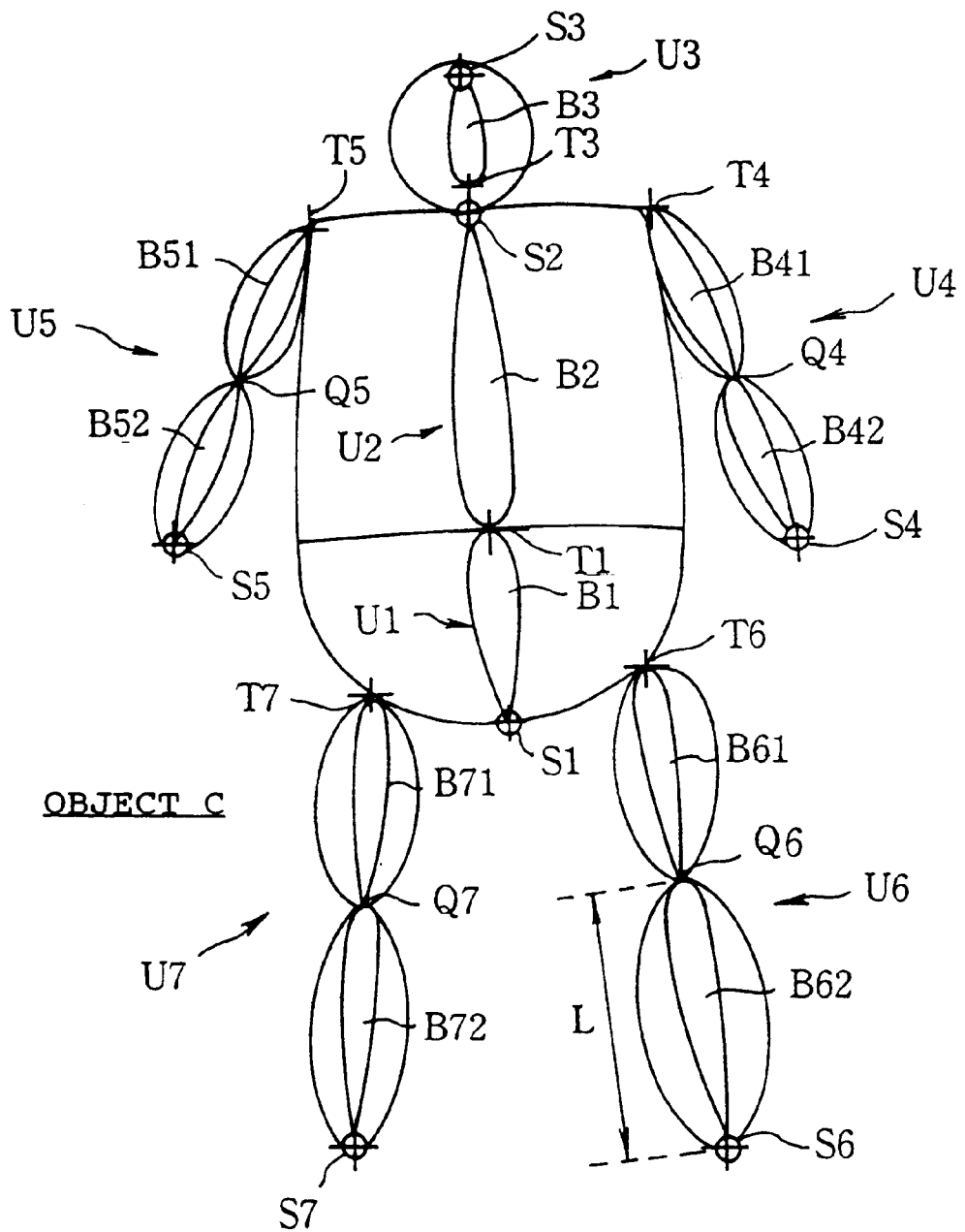
FIG. 28 is a diagram for describing the structure of a object relating to a second mode for implementing the present invention.

FIG. 28 is a diagram for describing the structure of a object. The design of object C shown in FIG. 28 is based on a human body, and it comprises, for example, a waist part U1, chest part U2, head part U3, left arm part U4, right arm part U5, left leg part U6, and a right leg part U7.

In this mode of implementation, each part U is defined as the area around one or two bones B (B1–B3; B4–B72), between a reference point and a control point (which are described later). The parts U include parts comprising one bone and parts comprising two bones.

The configuration of a part is defined by coordinates data relating to its reference point T (T1–T7), coordinates data relating to its control point S (S1–S7), the bone located between the reference point T and control point S and, if there are two bones, the angle between the bones.

In this mode of implementation, the angles of the bones in each part in a prescribed coordinates system are calculated on the basis of data relating to the control point S and the reference point T, and a bone B is placed between the reference point T and the control point S according to the angle data in this coordinates system. Here, the "reference point T" forms a reference for defining a part, and it is set towards the base end of each part. The "control point S" is a point used to determine a further position of the part with respect to the reference point T, and it is set towards the outer end of each part.

The reference points comprise a relative coordinates data group which corresponds to the path of a series of movements of each part, and the control points comprise a data group of prescribed positions taken by the outer end of each part through the series of movements, which correspond to the series of movements of each part, or which are unrelated to these movements.

In addition to relative coordinates data, the data forming the reference points also contains the relative angles formed between the coordinates systems of the reference point and an absolute coordinates system.

In object C, one part of the aforementioned parts U1–U7 is selected as a base part and the other parts are set as attached parts. Desirably, the base part should be set as the part that is central in a series of movements of the object between timings t1 and t13 set at prescribed time intervals (this series of movements is called a "motion", and one example of this "motion" is illustrated in FIG. 22). For example, desirably, it should the waist part U1. It may also be the chest part U2. In the present mode of implementation, for the sake of convenience, the waist part U1 is taken as the base part.

For each part, coordinates data for the reference point T or control point S at each timing t1, t2, . . . in the motion is calculated by means of a prescribed spline function, thereby dramatically reducing the volume of data for points T and S between timings, and making it possible to represent a motion smoothly.

A "spline" function is a function which generates by approximation a smooth curve passing through each of a plurality of given points. Therefore, it is advantageous to use this function when generating smooth movement.

The spline function is a segmented multiple-component function, and since differentiation and integration are straightforward procedures, it is simple to produce the required smooth line using computer graphics technology. Specifically, by defining connecting points between reference points, or between control points, by means of a spline function, smooth movement can be applied to the object.

Figure 29:
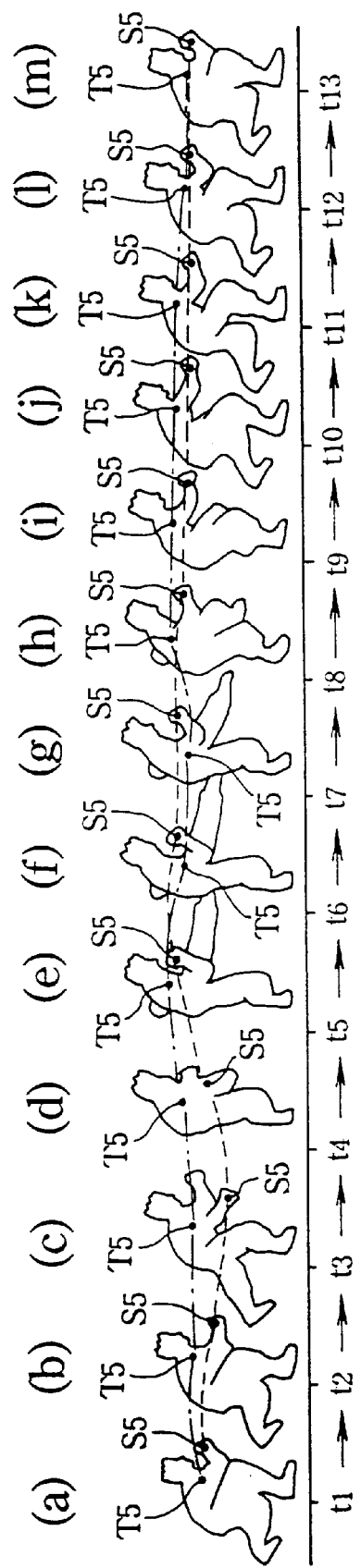
FIG. 29 is a diagram for describing motion capture relating to a second mode for implementing the present invention.

For example, FIG. 29 gives a representative illustration for the right arm part U5 and reference point T5, and by calculating the paths of the reference point and control point for this part with regard to motion data by means of a spline function, or by storing these paths as data, depending on circumstances, it is possible to represent smooth movement as indicated by the broken line and the single-dot line.

In object C, the reference point T1 of the waist part U1 is located in an absolute three-dimensional coordinates system, and the reference points T2–T7 of parts U2–U7 are positioned relatively with respect to T1, thereby linking all the parts to the waist part U1 and, as a result, making it possible to display the whole object as a object which changes shape.

Figure 30:
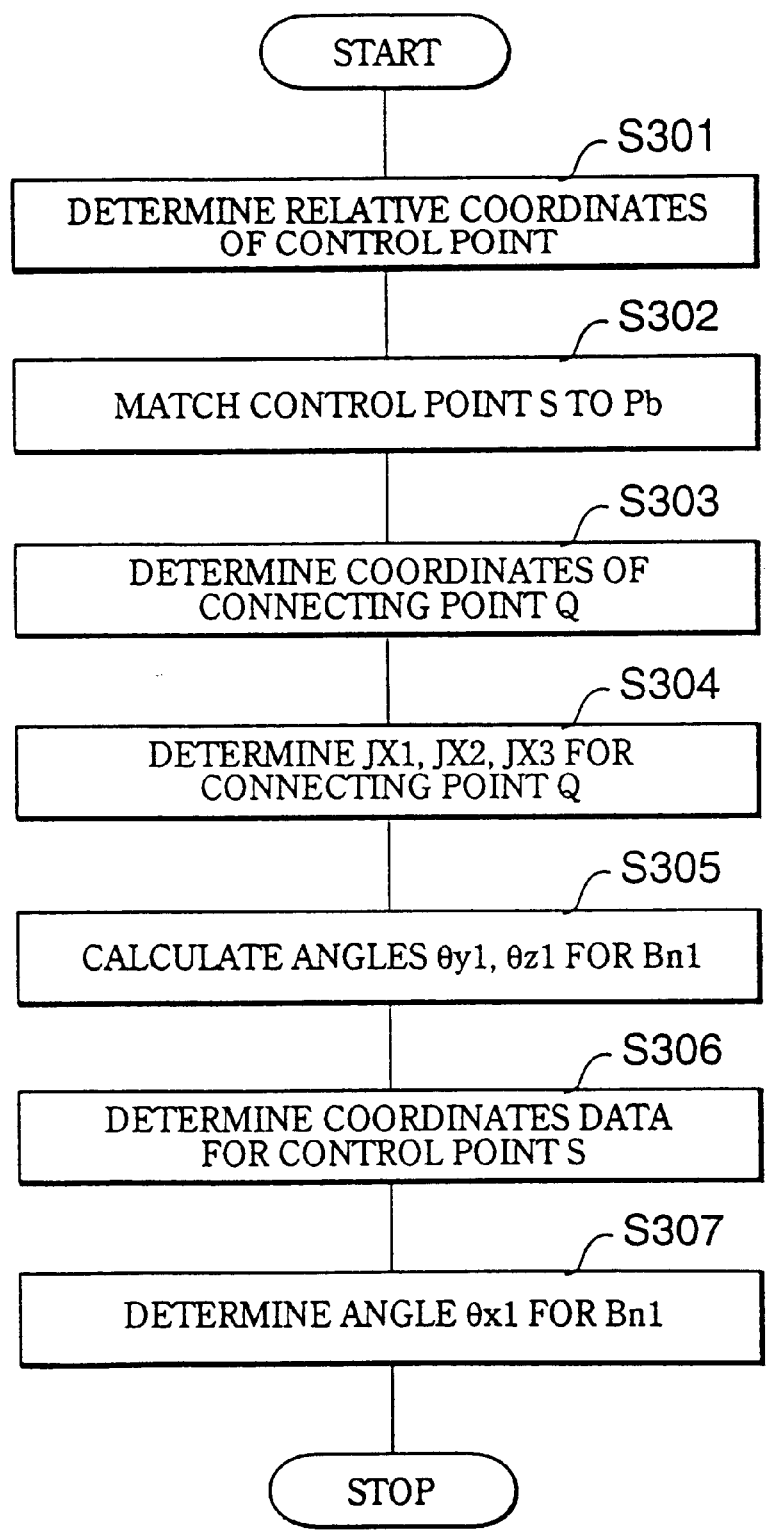
FIG. 30 is a flowchart of processing relating to a second mode for implementing the present invention.
Figure 31:
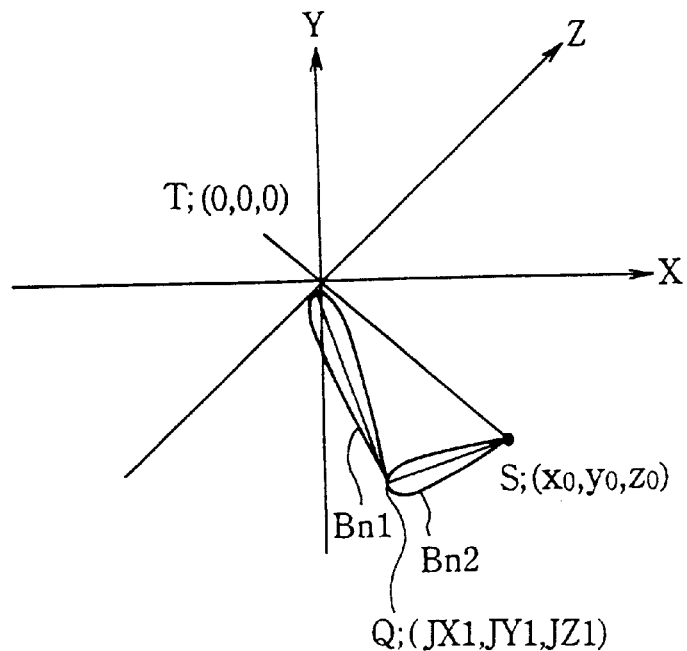
FIG. 31 is an explanatory diagram of processing relating to a second mode for implementing the present invention.
Figure 32:
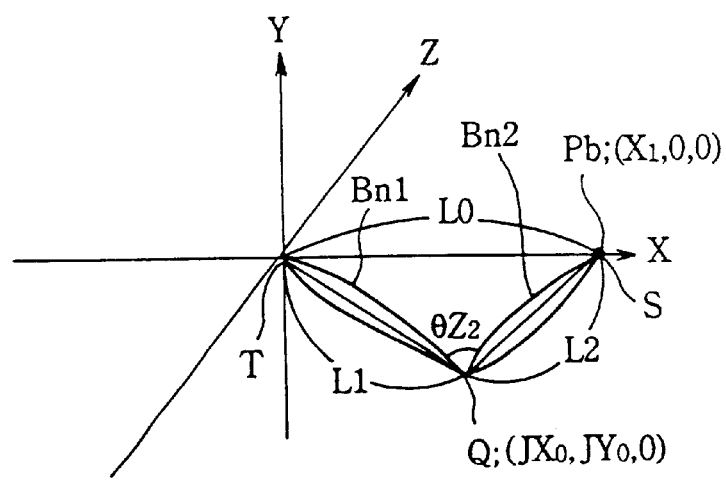
FIG. 32 is an explanatory diagram of processing relating to a second mode for implementing the present invention.
Figure 33:
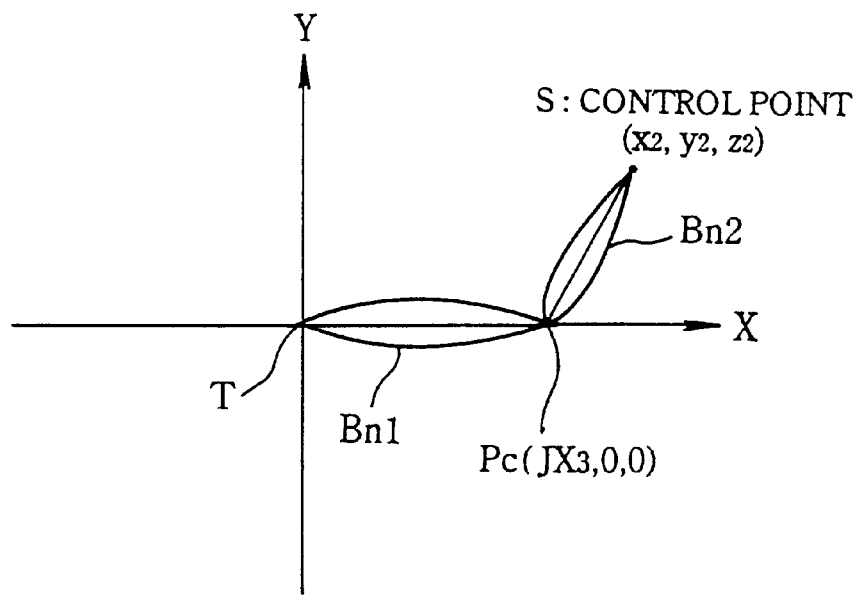
FIG. 33 is an explanatory diagram of processing relating to a second mode for implementing the present invention.
Figure 34:
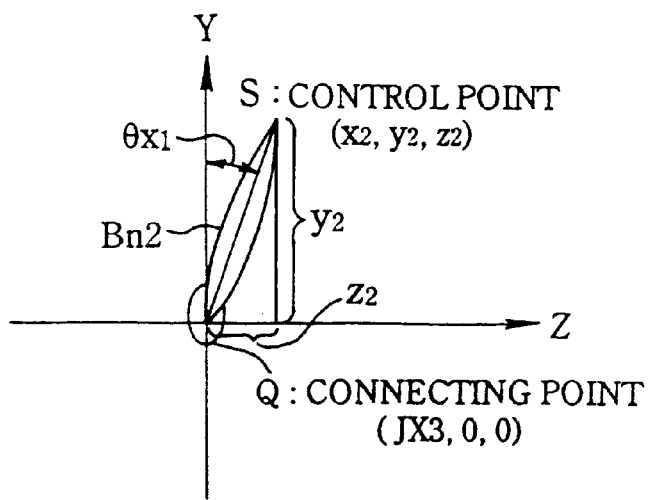
FIG. 34 is an explanatory diagram of processing relating to a second mode for implementing the present invention.

Next, the processing involved in displaying a part comprising two bones is described with reference to the flow-chart in FIG. 30 and the illustrative diagrams in FIGS. 31–34. FIG. 31 shows the state of a part U comprising two bones Bn1, Bn2, when its reference point T is positioned at the origin (0, 0, 0) of a perpendicular coordinates system. FIG. 32 shows the state of this part U when its control point S has moved to point Pb (X1, 0, 0) on the X axis of this coordinates system. FIG. 33 shows a state where the connecting point Q between the two bones Bn1, Bn2 is positioned at a virtual point Pc (JX3, 0, 0) in the perpendicular coordinates system. FIG. 34 shows a state where the connecting point Q between the two bones Bn1, Bn2 is viewed from the Y, Z plane of the perpendicular coordinates system. Part U which comprises two bones Bn1 and Bn2 in this way corresponds to the right arm, left arm, right leg or left leg.

Calculation starts assuming that the reference point T of part U is at the origin (0, 0, 0) of the reference point coordinates system. By deriving the reverse matrix of the matrix for reference point T of part U, and multiplying this by the absolute coordinates for the control point S, the relative coordinates for the control point (X0, y0, z0) are found (S301).

FIG. 31 shows a state where, by conducting this calculational operation, the original absolute coordinates for the control point are moved, or converted, to relative coordinates (x0, y0, z0) with respect to the reference point of part U. In this state, as shown in FIG. 32, a point Pb (X1, 0, 0) on the X axis is supposed. Thereupon, an operation is performed to bring the control point S of part U to this point (X1, 0, 0) (S302). In other words, if the coordinates system is rotated in sequence about the Z axis and then about the Y axis using prescribed formulae, the control point S of part U will assume a state of having moved to point Pb on the X axis, as illustrated in FIG. 32.

When it reaches this state, if the length of bone Bn1 is taken as L1, the length of bone Bn2, as L2, the length from the origin to point Pb, as L0, and the angle formed by bones Bn1 and Bn2, as θZ2, as shown in FIG. 32, then the coordinates of connecting point Q and the angle θz2 can be derived using the cosine rule (S303).

In this state, processing is implemented to return the coordinates data for connecting point Q to the original coordinates system. In other words, it is rotated through the derived angles θZ0, θY0 in the order of rotation about the Z axis, followed by rotation about the Y axis. Thereby, the coordinates data for connecting point Q (JX1, JY1, JZ1) is found (S304).

Thereupon, point Pb on the X axis (X1, 0, 0) is rotated in the order Z, Y, and the angle whereby it coincides with connecting point Q (JX1, JY1, JZ1) is derived. Thereby, as shown in FIG. 33, connecting point Q assumes a state where it has moved to point Pc (JX3, 0, 0) on the X axis. When it reaches this state, the angles formed between bone Bn1 and the Y axis and Z axis (θY1, θZ1) are calculated (S305).

By rotating the control point S (x0, y0, z0) in order about the Y axis and then Z axis by negative values (−θY1, −θZ1) corresponding to the angles (θY1, θZ1) of bone Bn1 calculated in S305, it is possible to calculate coordinates data for the control point S (x2, y2, z2) (S306).

Furthermore, the angle θX1 of the bone Bn1 can be calculated using data for the point found in step S306 above (S307; see FIG. 34).

When converting to coordinates data (x2, y2, z2) for the control point S, if this coordinates system is viewed in the direction of the X axis (viewed as plane Y,Z), then the control point S will be a point shifted by an angle of θX1 with respect to plane Y,Z. By correcting this shift by angle θX1, the control point S can be made to coincide with plane Y,Z. This angle θX1 is the angle formed between bone Bn1 and the X axis.

In this way, the angle of the bone Bn1 can be set to θX1, θY1, θz1, and the angle of bone Bn2 can be set to π−θZ2. Thus, bone Bn1 has three angles, whereas bone Bn2 only has an angle with respect to the Z axis.

Furthermore, if the direction of bending between bone Bn1 and bone Bn2 is minus 180°, then the sign of the processing result should be reversed, π should be subtracted from angle θX1 of bone Bn1 (θX1−π) and the sign of the angle θZ2 of bone Bn2 should be reversed.

Since the angles of bones Bn1 and Bn2 can be determined in this way, by moving and positioning the bones Bn1 and Bn2 such that they form these angles, the bones can be determined by the coordinates data for the positions of the reference point T and control point S of the part U.

If the angle between bones Bn1 and Bn2 is 180°, in other words, if the two bones are in a fully extended state, it is not possible to specify which axis to rotate bones Bn1 or Bn2 about. If an axis is specified, the bones Bn1, Bn2 may rotate about the axis in an unnatural direction. For example, if bones Bn1 and Bn2 form a leg, then the leg may bend in a direction which is not usually possible.

Figure 35:
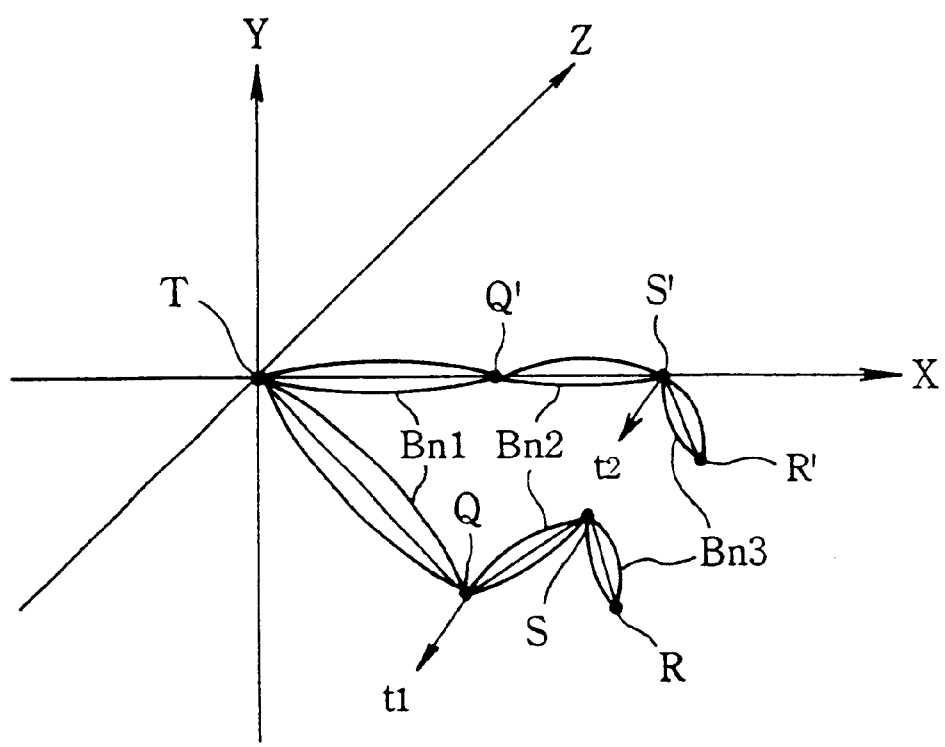
FIG. 35 is an explanatory diagram of processing relating to a second mode for implementing the present invention.

An example of this state is shown in FIG. 35. Bones Bn1 and Bn2 form a leg, and bone Bn3 forms a heel. In the state T-Q-S-R, a normal t1 is determined from bones Bn1 and Bn2, and therefore bones Bn1 and Bn2 rotate about this normal t1. However, in the state T-Q'-S'-R', bones Bn1 and Bn2 both lie on the X axis, and a normal line cannot be determined. Therefore, in this case, instead of a normal between bones Bn1 and Bn2, a normal t2 is determined between bones Bn2 and Bn3. In other words, since point Q' clearly forms a joint, its direction is taken as the direction of normal t2. By using this method, it is possible to derive an axis of rotation for a joint even when a normal to the joint cannot be obtained. The normal t2 can be used instead of normal t1 in this way because bone Bn3 forms a heel and resembles the other bones in terms of joint movement. Therefore, it is possible to substitute a normal used for a movement that is some way related. This method is not limited to cases where the normals lie in the same direction, but may also be applied to cases where they obey a fixed relationship (for example, they are always perpendicular to each other).

According to the second mode for implementing this invention, it is possible to specify the direction of rotation and always obtain correct rotation even in cases where, for example, a leg is fully extended. Hence, there is no occurrence of unnatural movement, such as a knee performing a full rotation.

Third mode for implementing the invention

The polygon models described in the aforementioned modes of implementation can be converted to two-dimensional images by positioning them in a three-dimensional coordinates space, and displaying them by projecting them onto a display screen from a prescribed position in the space (hereafter, described as "camera" or "camera position"). In particular, since polygon models obtained according to the aforementioned modes of implementation display natural movement when they are moved, they are suitable for simulating the movement of a real person, or the like.

The device used in the present mode of implementation is a game device as used in the aforementioned first mode of implementation. However, the program supplied by the recording medium, such as a CD-ROM, or the like, implements the following processing for creating a promotional video.

Here, a "promotional video" refers to a video film as used generally to promote a singer, and it normally comprises a series of images of the singer him or herself, which are edited to match a song (for example, scenes of the singer dancing in time to the music, or the like). This mode of implementation relates to a program whereby an ordinary user can create such a video easily him or herself, by using an object composed of polygons, in other words, a object, in place of an actual singer.

In this mode, the keys of the pads 2b operated by the user are assigned different functions to those in a normal game. For example, the following functions may be assigned.

| Key name | Function |
|---|---|
| START | Pause on/off; menu display on/off |
| X + A | Lyrics display on/off |
| L | Zoom out |

-continued

| Key name | Function |
|---|---|
| R | Zoom in |
| Direction keys | Turn camera (viewpoint) |
| Direction keys during playback | Select |
| A during playback | Set |
| Other keys | Different effects (RGB lights, flashes, fireworks, etc.) |

Processing in the present mode

Figure 36:
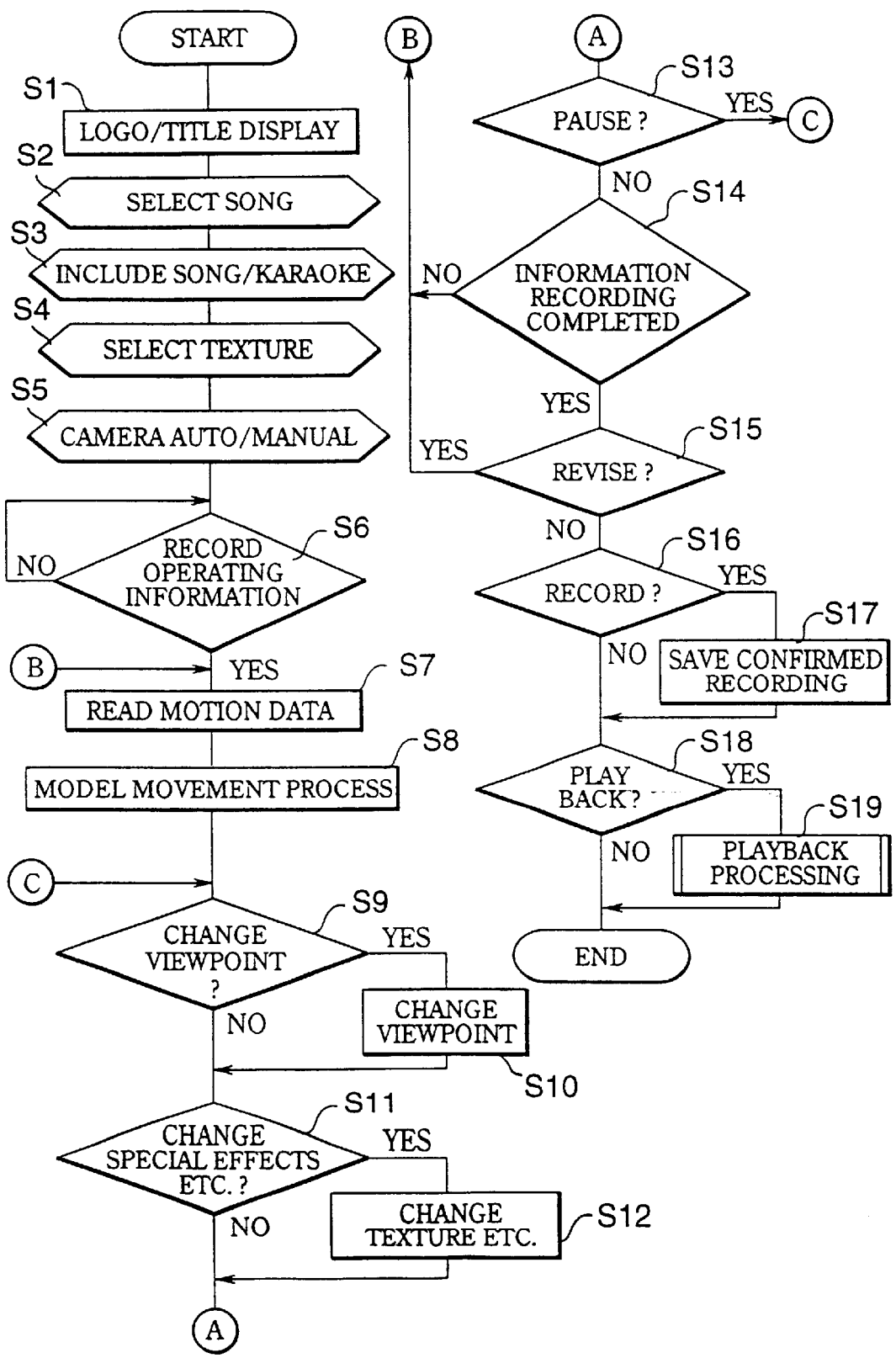
FIG. 36 is a flowchart of a program for creating promotional videos according to a third mode for implementing the present invention.

FIG. 36 shows a flowchart of a program for creating a promotional video using a object according to the aforementioned modes of implementation.

Step S1: "Logo/Title display" refers to a display of the manufacturer's name, program title, opening movie, or a demonstration using a pop-star, or the like, which is repeated until the user gives a start instruction.

Step S2: Firstly, the user selects a song. By selecting the song, the type of dancing that the object will be made to perform is determined. In other words, in the present mode, the object selected by the user is caused to perform movement similar to an actual singer dancing. Various types of song for causing the object to dance are prepared. The object moves differently depending on the song. The object's movements are recorded in motion data prepared for the song. Desirably, this motion data should be generated by recording the movements of a real singer using motion capture technology, as described previously. For example, the movements of the joints of a singer recorded at each sample are converted to coordinates for the joints of a object, which is formed by a polygon data group. Motion data is a collection of converted coordinates for a plurality of sampling points and spanning a prescribed time period.

Step S3: Next, the user selects whether to create a promotional video containing the singer's voice, or a promotional video without the singer's voice for use as a karaoke backing.

Step S4: Next, texture is selected. "Texture" refers to the pattern applied to the polygons forming the object. In this case, both the object's face and the object's clothing are selected.

The object's face is selected from faces prepared in advance by the program. Desirably, a three-dimensional scanner should be provided with the game device illustrated in FIG. 2, such that the user can use his or her own face, or a picture or photograph that he or she has prepared, as the object's face. FIG. 38 shows an example wherein the user's own face is input by a three-dimensional scanner, and converted to polygon data. Each region of the face is recorded in the form of three-dimensional coordinates by the three-dimensional scanner (FIG. 38B). When this is converted to polygon data, polygons should be made to correspond to all areas of the skin by means of a prescribed procedure, so that there are no gaps between the polygons (FIG. 38A). In this case, if the face region of a polygon model is created using a large number of polygons, a more realistic and pleasing facial image can be reproduced than when a photograph or picture is applied. However, if too many polygons are used, the load on the CPU just for displaying the object will become large, so it is necessary to restrict the number of polygons. As a measure of this restriction, a natural looking facial object such as that illustrated in FIG. 38A can be created by approximately 96 polygons.

Step S5: The user determines the camera switching mode, in other words, whether the viewpoint from which the object is observed is to be changed automatically (auto), or manually (manual). Automatic changing is a mode which switches automatically between a plurality of cameras, changing the positional coordinates of the camera automatically in a procedure determined by the program. Manual switching is a mode where the viewpoint is switched by the user operating the pad 2b. The change in viewpoint described here refers both to cases where the positional coordinates of one camera changes continuously, and cases where the viewpoint switches instantly by switching between a plurality of cameras.

Step S6: Recording of operating information refers to the process of recording texture and special effects, such as scenery, and the like, applied to the object obtained by the above setting process, into a RAM in accordance with change over time of the viewpoint coordinates. Basic data such as motion data and texture data is supplied by the program data, so provided that the type of texture data selected and the positional coordinates of the viewpoint at each sample timing are recorded, thereafter, images and sounds can be reproduced as though playing back a video tape, on the basis of the same basic data.

If the user gives an instruction to start information recording (YES), steps S7–S13 below are repeated for each display timing, and the corresponding viewpoint and texture data, etc. are stored in succession in the RAM.

Step S7: Firstly, the initial motion data is read out. This motion data indicates the positional coordinates of each joint of a object.

Step S8: Polygon data deformation processing is then conducted in accordance with the aforementioned modes of implementation, on the basis of the read out motion data. Thereupon, a two-dimensional image obtained by observing a virtual image containing this object from the positional coordinates for the viewpoint set in the initial state, is generated by perspective conversion.

Step S9: It is determined whether or not a viewpoint change has been indicated by the program data or by the operations of the user. If the viewpoint is to change (YES), then the viewpoint is moved to a new viewpoint indicated by the program data, or it is moved in the direction indicated by the user's controls (S10).

Figure 39:
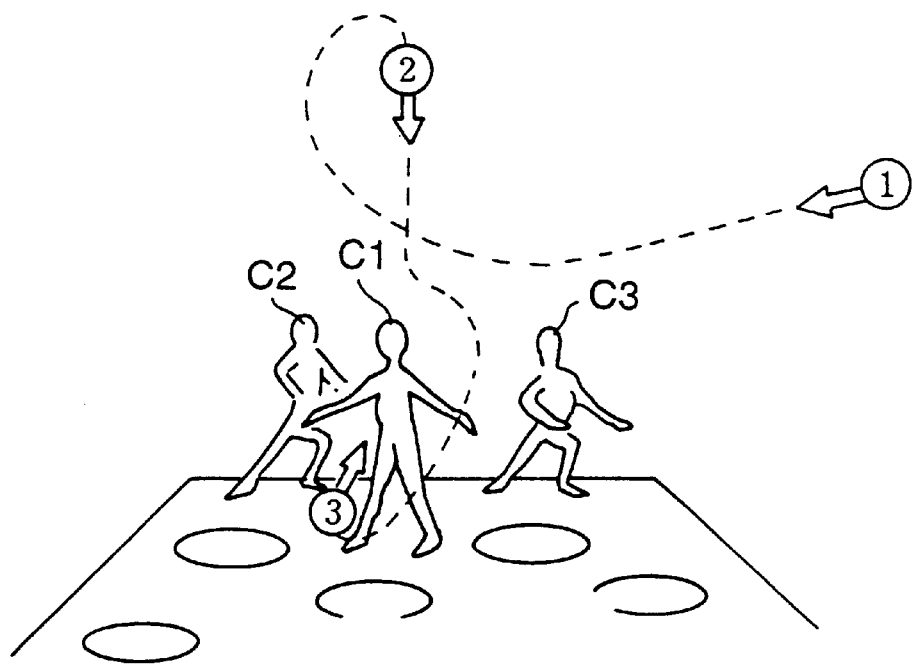
FIG. 39 is an illustrative diagram of positional relationships between objects and viewpoints in a virtual space.
Figure 40:
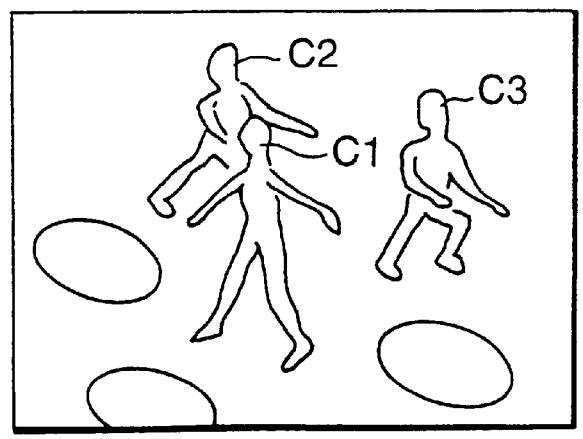
FIG. 40 is an example of an image display from viewpoint (1).
Figure 41:
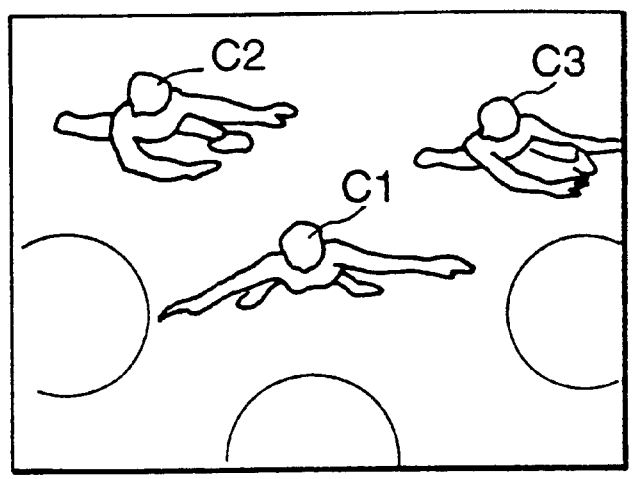
FIG. 41 is an example of an image display from viewpoint (2).
Figure 42:
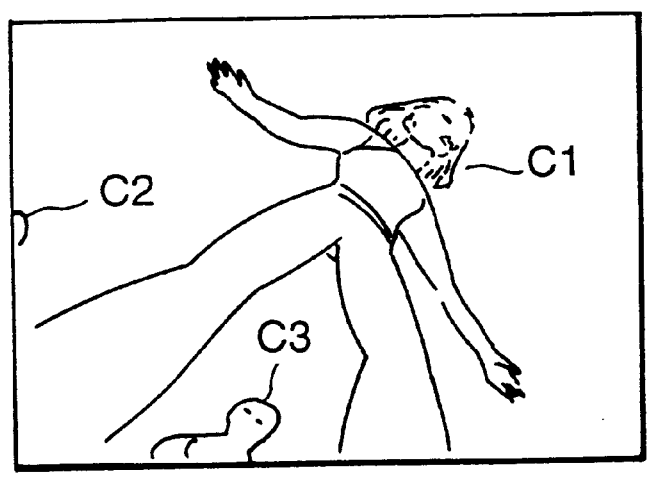
FIG. 42 is an example of an image display from viewpoint (3).

FIG. 39 illustrates the relationship between objects and viewpoints in a virtual space. In this diagram, this means the direction of the viewpoint for observing a central object C1 and two objects C2 and C3 behind C1 which are dancing on a stage. As shown in FIG. 39, in the initial state, the viewpoint is set at point (1). The image obtained from this viewpoint (1) may be like that shown in FIG. 40, for example. This viewpoint moves, for example, along the dotted line in the diagram, due to commands from the program or operations by the user. In this case, the form of the generated image changes gradually, since the viewpoint moves continuously along the dotted line. For example, from viewpoint (2), where the viewpoint has moved to directly above object C1, an image like that shown in FIG. 41 is generated. Moreover, from viewpoint (3), where the viewpoint has moved to the feet of object C1, an image like that shown in FIG. 42 is generated. The display of objects C2 and C3 representing backing dancers, or the like, is described later with reference to FIG. 50.

If an actual pop-star is used as a object, there may theoretically be angles which it is not desirable to show, and in this case, prohibited regions should be provided by the program so that the viewpoint cannot move to these undesirable angles.

Step S11: Special effects applied to objects and background can be changed at any time. Therefore, by indicating a change in texture data, the user can change the displayed form of the object or background suddenly (S12). The special effects which can be selected in the present mode are described later (FIG. 43–FIG. 51).

Step S13: It is possible to select whether or not to engage a pause. It is desirable to engage a pause when the user wishes to switch viewpoint or texture data, or the like. If a pause is engaged (YES) and the viewpoint is to be changed during this pause (S9 and S10), then it is possible to develop a scenario which retains the viewer's interest, in the same way that scenes are developed by switching cameras in an actual promotional video. The viewpoint change may involve switching between a plurality of cameras, or it may involve moving the position of a single camera. The texture data or the like may also be changed (S11 and S12). If the texture data or the like is changed as well as switching the viewpoint, then the image can be developed such that the face and clothes of the object, and special effects such as the pattern of the background, and the like, change each time the camera switches.

Step S14: As long as the information recording has not been completed (NO), in other words, as long as the song continues and there is no compulsory termination indicated by the user, steps S7–S13 are repeated. When the song has finished, or when the user indicates a compulsory termination (YES), the recording of operating information is terminated.

Step S15: If revisions are to be made (YES), then recording of operating information (steps S7–S14) is repeated once more, whilst the video is played back, and the necessary revisions are made. When revising, it is possible to start playback,
rewind,
fast forward,
set repeat loops,
set repeats, etc.

on the basis of the recording operating information.

Step S16: If there are no revisions to be made (S15: NO), the user confirms whether or not the recording is to be saved, and if the user confirms (YES), then a recording process is implemented whereby this operating information is saved (S17).

Step S18: If the user wishes to play back the video (YES), then playback processing is implemented (S19).

Figure 37:
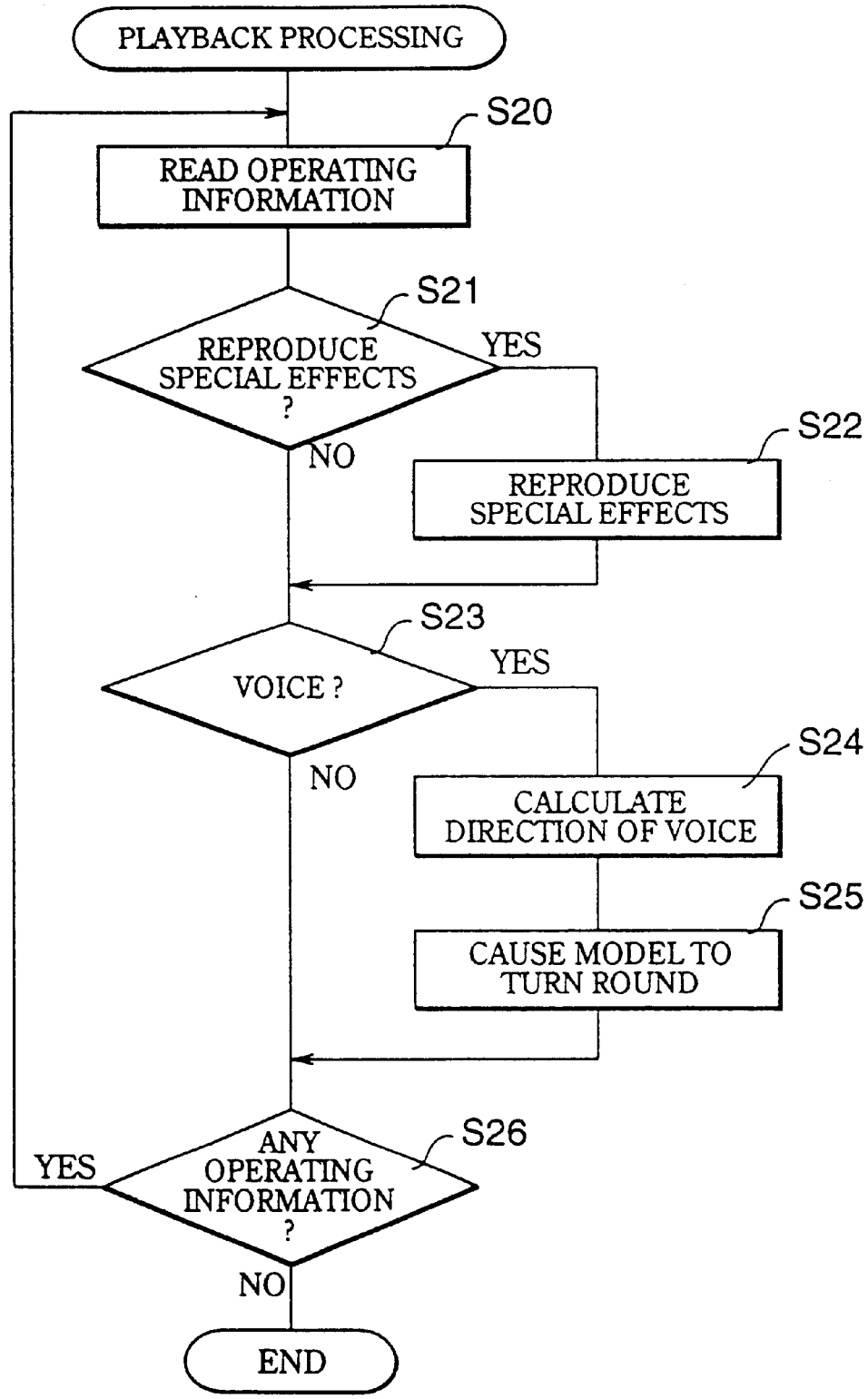
FIG. 37 is a flowchart describing playback processing according to a third mode for implementing the present invention.

FIG. 37 shows a flowchart of more detailed processing in a playback operation.

Similarly to recording, playback processing involves reading out operating information for each display timing (S20), and generating images and sound on the basis of this and the motion data and sound data forming basic data. In playback processing, the video can be played back at the same speed as the recording speed, or similarly to revision processing during recording, the user can control the start of playback, rewind, fast forward, setting of repeat loops, setting of repeats, and the like.

If special effects reproduction is indicated during playback (S21: YES), then special effects are reproduced (S22). If the game device is capable of detecting the user's voice, it searches for the presence of a voice (S23). If a voice is detected (S23: YES), then the direction of the voice is set as the direction of the positional coordinates of the viewpoint location as viewed from the object on the display. Therefore, firstly, the direction of this viewpoint is calculated (S24), and conversion processing is then applied to the polygon data so that the face of the object turns to look in the direction of the viewpoint (S25). In this way, it is possible to provide an interactive presentation whereby, whatever direction the object's face is pointing in, the face will turn towards a user who has called out, in other words, towards the screen, in the manner of a singer responding to the cries of fans.

Figure 52:
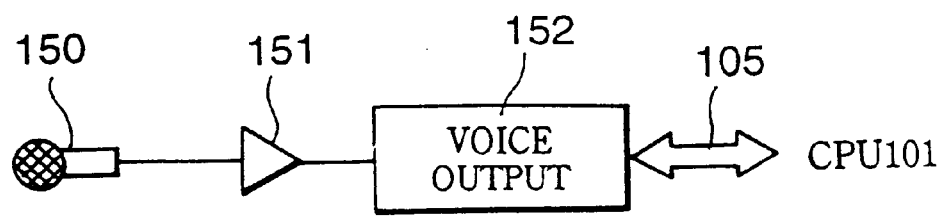
FIG. 52 is a compositional example of a sound detecting circuit.

As shown in FIG. 52, a composition whereby a voice can be detected involves providing a microphone 150 for converting the voice into an electrical sound signal, an amplifier 151 for amplifying this sound signal, and a detecting circuit 152 for detecting the presence of a sound on the basis of this sound signal, and transmitting it to the CPU 101, and the like.

If there is operating information remaining (S26: YES), the next item of operating information is gathered, the presence or absence of special effects (S21) and a voice (S23) is determined, and playback of the promotional video is repeated on the basis of the operating information.

Description of special effects

Special effects provided by the present mode are now described with reference to FIG. 43 to FIG. 51.

Figure 43:
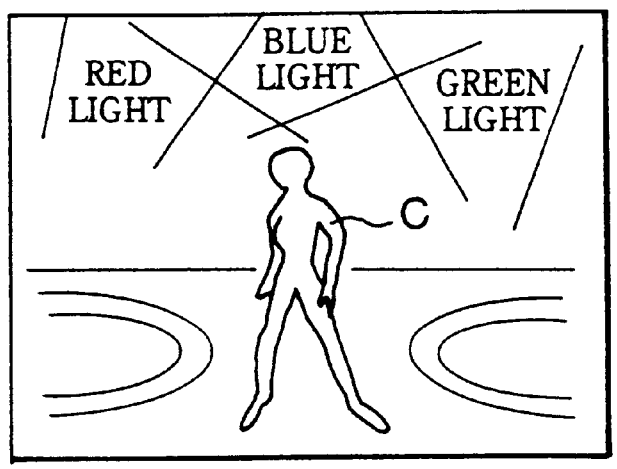
FIG. 43 is a display example of a special effect involving coloured lighting.

FIG. 43 shows a special effect involving coloured lights. Presentations involving lights are commonplace for an actual singer on a stage. The special effect illustrated in FIG. 43 simulates such a presentation, by synthesizing texture data representing red (R), green (G) and blue B lights with background texture data directed from above towards a object C. Thereby, the user is provided with a visual effect which gives the impression of watching an actual stage.

Figure 44:
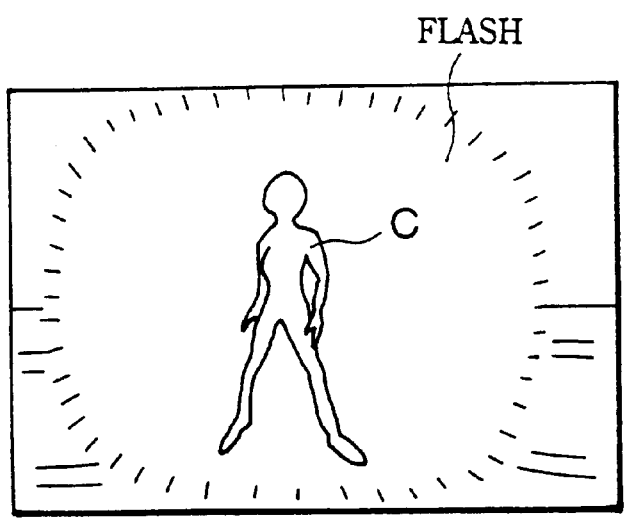
FIG. 44 is a display example of a special effect involving flash lighting.

FIG. 44 shows a special effect involving flashes. In an actual stage presentation, flash photographs may be taken. The special effect illustrated in FIG. 44 simulates such a presentation, by synthesizing bright texture data with the screen texture centered on object C. By implementing this special effect at regular intervals, it is possible to provide a visual effect which gives the impression of watching an actual stage.

Figure 45:
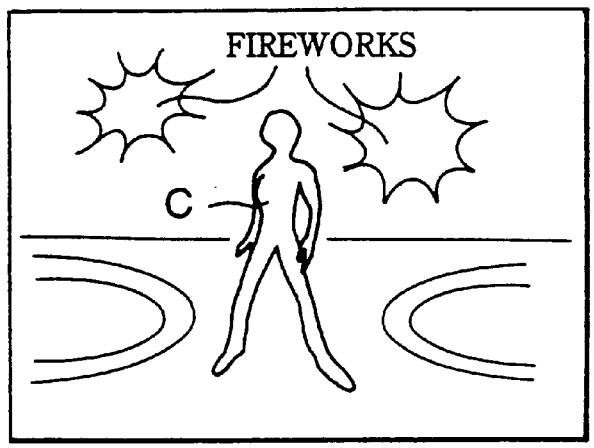
FIG. 45 is a display example of a special effect involving fireworks.

FIG. 45 shows a special effect involving fireworks. In an actual stage presentation, fireworks may be set off at certain points in a song. The special effect illustrated in FIG. 45 simulates such a presentation, by displaying a firework texture pattern around the object C. By implementing this special effect, it is possible to provide added climax to a presentation.

Figure 46:
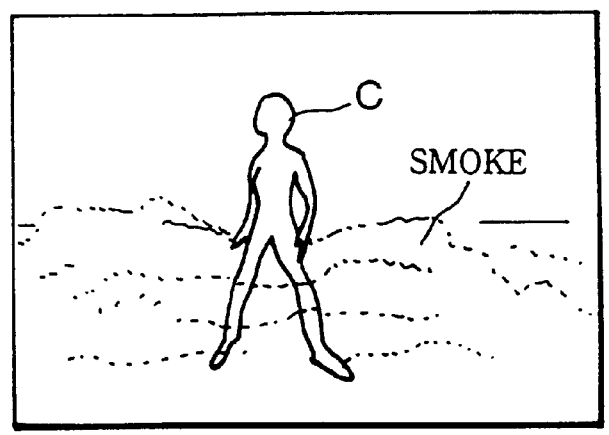
FIG. 46 is a display example of a special effect involving smoke.

FIG. 46 shows a special effect involving smoke. In an actual stage presentation, smoke using dry ice, or the like, may emitted according to the mood of the song. The special effect illustrated in FIG. 46 simulates such a presentation, by synthesizing a plurality of cloud-shaped texture patterns with the texture surrounding the object C. By progressive movement of this texture, the object C can be caused to disappear behind the smoke. By means of this special effect, it is possible to provide a presentation wherein a song climaxes with the performer singing emotionally at the top of his or her voice.

Figure 47:
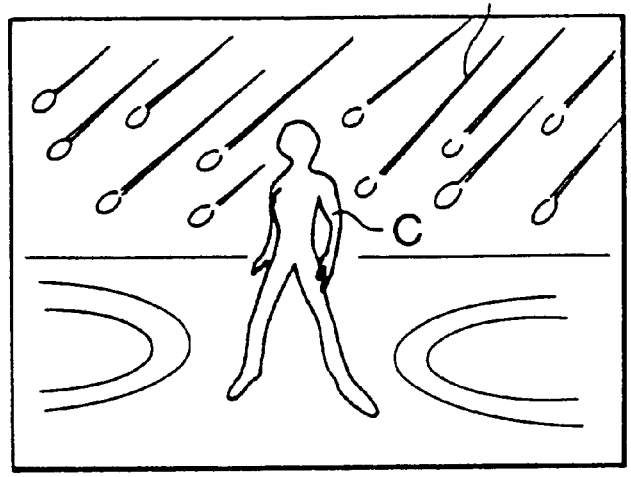
FIG. 47 is a display example of a special effect involving shooting stars.

FIG. 47 shows a special effect involving a shower of shooting stars. In an actual stage presentation, a night-sky may be depicted if the theme of a song evokes thoughts of a starry night-sky. The special effect illustrated in FIG. 47 aims to provide a visual effect of this kind, by displaying a texture pattern of falling shooting stars behind the object C. By means of this texture data, it is possible to provide a presentation wherein a song climaxes with the theme of a night-sky.

Figure 48:
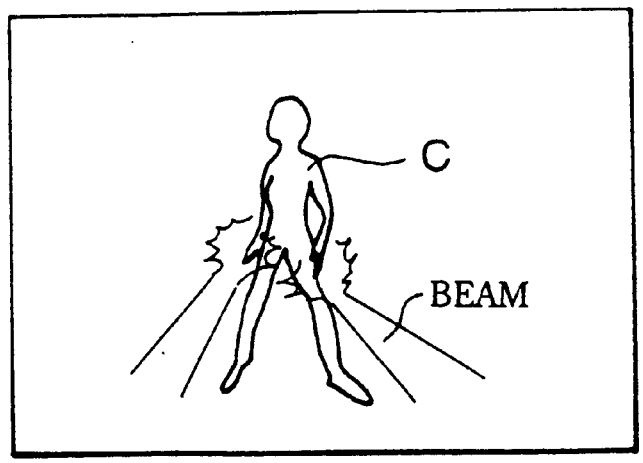
FIG. 48 is a display example of a special effect involving beams.

FIG. 48 shows a special effect whereby beams are emitted from the singer's hands. This special effect causes beams of light to be emitted from the hands of the object C. Texture data representing a beam of light travelling in a desired direction is displayed being emitted from the positional coordinates of the polygons at the tips of the object's hands. By means of this special effect, it is possible to provide a presentation wherein a song climaxes with a science fiction theme.

Figure 49:
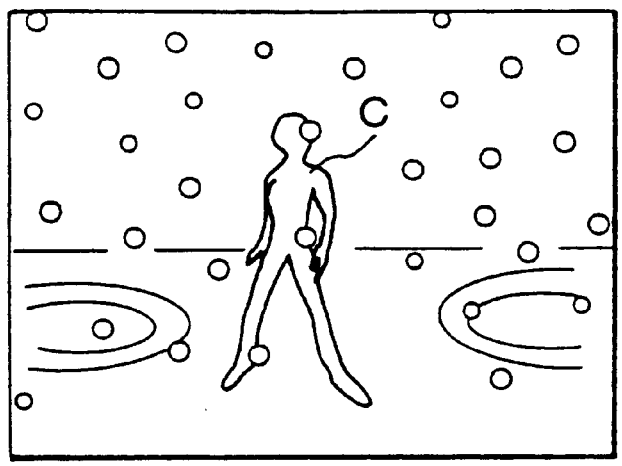
FIG. 49 is a display example of a special effect involving snow.

FIG. 49 shows a special effect involving falling snow. In an actual stage presentation, imitation snow may be caused to fall in a song on the theme of "winter". The special effect illustrated in FIG. 49 simulates such a presentation, by preparing a plurality of snow texture patterns, and synthesizing these texture patterns with the texture pattern behind the object. If the snow texture patterns are caused to flutter whilst moving downwards, the appearance of falling snow can be simulated. By means of this special effect, it is possible to provide a presentation wherein a song climaxes on the theme of "winter".

In a presentation of this kind, it may be assumed that the temperature on the stage has changed and the movements of the object may be changed in accordance with the temperature. For example, in a scene where snow is falling, it can be imagined that the temperature is low, and motion data producing a "shivering" action in the object can be applied. Furthermore, in a scene where the sun is shining on the object, or the object is moving about, it can be imagined that the temperature is high and motion data producing a "sweating" action in the object can be applied. These temperature settings may be provided as play elements, which can be set by the user as desired.

Figure 50:
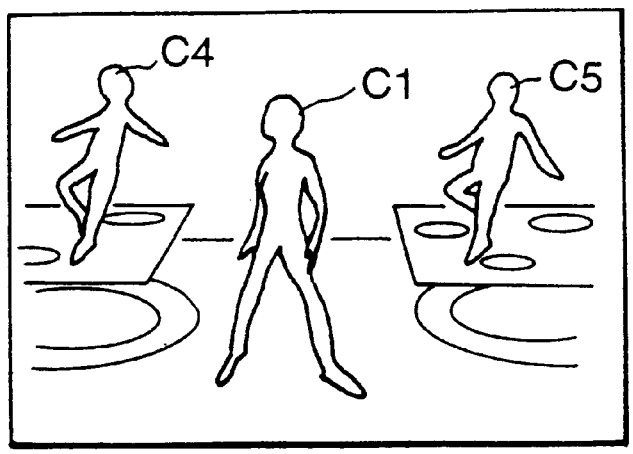
FIG. 50 is a display example of a special effect whereby other objects are displayed.

FIG. 50 shows a special effect involving backing dancers. In an actual stage presentation, there are often several backing dancers or a backing chorus. The special effect illustrated in FIG. 50 simulates this, by displaying objects C4 and C5 dancing in the background, in addition to object C1. If the objects C4 and C5 representing the backing dancers, or the like, are formed using polygon data having a larger surface area than the central object C1, then processing becomes faster. Furthermore, even if there is a plurality of backing dancers, or the like, since they all perform the same movements, it is possible to control the movement of a single object of a backing dancer, or the like, and then reproduce the data for this object to display the other objects. Moreover, the objects of backing dancers, or the like, may be displayed by switching texture data alone, rather than using polygon data.

Furthermore, it is not necessary to position the central object of the singer and the other objects of the back dancers, or the like, on the same stage, but rather, they can be made to dance on different stages.

Figure 51:
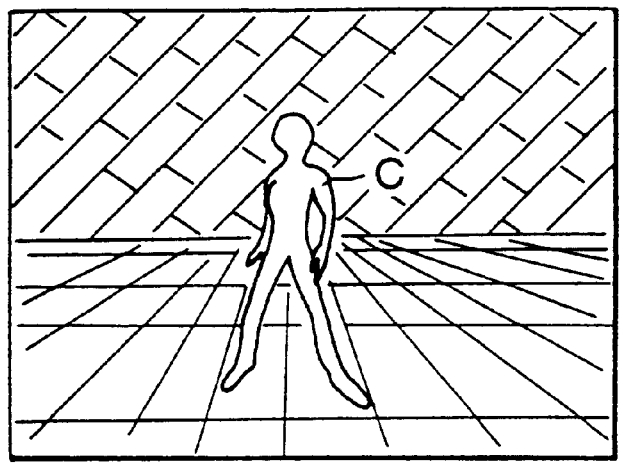
FIG. 51 is a modification example of texture data.

FIG. 51 shows a background display example using different texture data. In an actual stage presentation, the scenery pattern may change or the object may change clothes as a song progresses. As illustrated in FIG. 51, by preparing various different texture data for scenery and clothing, it is possible to provide a presentation as described above wherein the scenery and clothing change during a song.

By altering the texture data, it is also possible to change the colour of the whole object or switch the object's face or hairstyle.

By means of the processing described above, it is possible to produce effects which give the user a real impression of being inside the virtual space, for example, by attaching the actual appearance of the user to the face polygons, and the user's interest is greatly enhanced thereby.

A realistic representation is possible by adjusting the number of polygons. If the number of polygons is above a certain number, then a realistic representation can be provided, but it is not necessary to increase the number of polygons excessively. In fact, in some cases, the stereoscopic impression can be increased by reducing the number of polygons. The number of polygons may be adjusted on the basis of data for an actual face obtained by means of a three-dimensional scanner. For example, the number of polygons may be increased or decreased according to the depth of the facial contours.

Modification example of third mode of implementation

Needless to say, a variety of additional ideas and applications can be conceived in the aforementioned modes of implementation.

For example, using motion capture technology as mentioned in the mode of implementation above, the user may participate from the stage of creating the object operating pattern, and the user's own actions may be used in the aforementioned program.

In this case, the program itself is not limited to creating promotional videos, but may also be applied, for example, to videos for recording a person's golf or baseball swing and then appreciating it later, (or receiving advice from a professional whilst appreciating it).

Furthermore, photographs for applying to face polygons may be prepared in advance. For example, if photographs of actors and actresses, sportsmen and sportswomen, etc. are prepared, then the user can cause his or her favourite star, or the like, to be depicted in the virtual space by applying a desired photograph to the object, thereby raising the interest of the user.

A variety of photographs may be applied to the polygons in different areas of the body and not just the face polygons. For example, by applying clothing, the clothes worn by the object can be selected, exactly like a doll with changeable clothing. In other words, by removing editing processes, such as operational recording, from the aforementioned program for creating a promotional video, it is possible to create software for appreciation wherein the user can enjoy changing the clothing, face or viewpoint etc. at any time during playback of a series of images. Changing the clothing or face simply involves changing the texture data applied to the polygons, and therefore it can be implemented without slowing processing, even during playback of the operational pattern.

Furthermore, a polygon model created by a conventional technique may be used in the aforementioned program instead of a object created according to the present invention.

Advantages of third mode of implementation

In contrast to conventional software which simply replays video images, in the present mode of implementation, by using polygon objects in the video domain, it is possible to change the viewpoint for observing a object as desired during video playback, simulate actual presentations wherein clothing etc. is changed during the action, and even to produce special effects which would not be possible in real life, and hence a new type of promotional video and promotional software can be provided which incorporates a game element.

These advantages can be provided more effectively by using polygon models according to the present invention which produce more realistic movement than conventional models.

Further modification example

The present invention is not limited to the aforementioned modes of implementation, but may be applied with various modifications. For example, in the aforementioned modes of implementation, the inelastic polygons, at the least, are treated as polygons having a fixed surface area, but it is also possible for the surface area of these inelastic polygons to be changed at each display period. In other words, the vertex coordinate values for the inelastic polygons, which are used as a reference for the elastic polygons, may be changed.

In particular, if the surface area of the inelastic polygons is set to zero, in other words, if they are set to have no surface area and only the vertex coordinate values used as reference for the elastic polygons are preserved, then all of the polygons displayed will be elastic. By this means, it is possible to create a natural simulation of a creature, or the like, whose whole body expands and contracts, such as an octopus, for example.

The entire disclosure of Japanese Patent Application NO.8-305368 filed on Nov. 15, 1996 including specification, claims, drawings and summary are incorporated herein by reference in its entirety.

INDUSTRIAL APPLICABILITY

According to the present invention, since the shapes of second polygons are changed in response to the movement of first polygons, such that no gaps are produced between the first polygons and the second polygons, it is possible to represent a object making natural movements, which resemble actual movements in a real object more closely than in the prior art. In particular, in computer graphics in a video game, or the like, areas of a object which bend can be moved in a natural manner, thereby creating a more realistic representation.

Furthermore, according to the present invention, in addition to changing the shape of a first element and a second element about prescribed axes, if no axis can be determined on the basis of the first element and second element, processing is conducted on the basis of the positional relationship between a second element and a third element, and therefore it is possible to convert data of different specifications efficiently, when using motion data, which records the movements of a real object, to influence the movement of a virtual object.

Furthermore, according to the present invention, since the presentation of images containing the object which changes shapes in a similar manner to a real object is controlled, the position of the viewpoint for observing the images containing the object is determined, and images obtained from the determined viewpoint are recorded, it is possible to record and play back video images wherein a variety of presentations are applied to a object. Therefore, it is possible to create virtually video images such as promotional videos, or the like.

What is claimed is:

1. An image processing device for displaying images of an object composed of at least a first part object, a second part object, and a third part object in the state where the shape of the object is being changed relative to specified axes, the image processing device comprising:

a memory for storing information about the first part object, the second part object, and the third part object; and a processing section which attempts to decide a first axis based on the information stored in the memory for the first part object and the second part object in such a manner that, when it is possible to decide the first axis, the processing section changes the shape of the object relative to the first axis, or when it is impossible to decide the first axis, the processing section changes the shape of the object relative to a second axis that is decided based on the information stored in the memory for the second part object and the third part object;

wherein there is a relationship between a relative movable range of the first part object and the second part object, and a relative movable range of the second part object and the third part object.

2. The image processing device according to claim 1, wherein the processing section changes the shape of the object relative to a first normal which is perpendicular to a plane including the first part object and the second part object, while it changes the shape of the object relative to a second normal which is perpendicular to a plane including the second part object and the third part object when the first part object and the second part object are positioned on the same straight line.

3. An image processing method for displaying images of an object composed of at least a first part object, a second part object, and a third part object in the state where the shape of the object is being changed relative to specified axes, the method comprising the steps of:

attempting to decide a first axis based on the information for the first part object and the second part object;

when it is possible to decide the first axis, deforming the object relative to the first axis; and when it is impossible to decide the first axis, deforming the object relative to a second axis that is decided based on the information stored in the memory for the second part object and the third part object;

wherein there is a relationship between a relative movable range of the first part object and the second part object, and a relative movable range of the second part object and the third part object.

4. An image processing method for displaying images of an object composed of at least a first part object, a second part object, and a third part object in the state where the shape of the object is being changed relative to specified axes, the method comprising the steps of:

attempting to change the shape of the object relative to a first normal which is perpendicular to a plane including the first part object and the second part object;

when it is possible to decide the first normal, changing the shape of the object relative to the first normal; and when it is impossible to decide the first normal, changing the shape of the object relative to a second normal which is perpendicular to a plane including the second part object and the third part object;

wherein there is the relationship between a relative movable range of the first part object and the second part object, and a relative movable range of the second part object and the third part object.

5. This invention is a recording medium wherein programs for causing processing steps according to claim 3 or claim 4 to be implemented in a computer are recorded.

6. An image processing method for displaying a state in which a shape of an object bends and changes by forming an object, which combines first polygons of which shape does not change and second polygons of which shape changes following the change of the coordinates of each vertex that forms the first polygons, and by enlarging the surface area of the inner side of the second polygons positioned on the bent area of the object to be larger than the surface area of the outer side.

7. An image processing method for displaying a shape change of an appearance of an object based on a relative position change of basic elements of the appearance of the object by forming the basic elements, which are combined with first polygons of which shape does not change, and by positioning between the first polygons second polygons of which shape changes in accordance with the change of the coordinates of each vertex that forms the first polygons in order to fill the gaps between the first polygons and the second polygons.

8. An image processing method for displaying a shape change of an object based on a rotation of first polygons of which shape does not change by linking the first polygons to second polygons of which shape changes following the change of the coordinates of each vertex that forms the first polygons in order to form the object in which the polygons facing the second polygons, which are positioned on a linking surface, rotate relatively to each other, and by setting the linking surface diagonally relative to an axis of rotation.

9. An image processing method for displaying a shape change of an appearance of an object based on a change of a position of a movable region, relative to a main region by forming a main region that forms from first polygons of which shape does not change the basic shape of the object and a movable region that changes position relative to the main region, and by positioning between the surroundings of the movable region and the main region second polygons of which shape changes following the change of the coordinates of each vertex that forms the first polygons.

* * * * *